United States Patent
Primus et al.

(10) Patent No.: US 10,837,401 B2
(45) Date of Patent: Nov. 17, 2020

(54) PISTON CROWN FOR A COMBUSTION SYSTEM AND AN ASSOCIATED METHOD THEREOF

(71) Applicant: GENERAL ELECTRIC COMPANY, Schenectady, NY (US)

(72) Inventors: Roy James Primus, Niskayuna, NY (US); Adam Edgar Klingbeil, Ballston Lake, NY (US); Dattatraya Somnath Bhagoji, Bengaluru (IN); Kevin Scott McElhaney, Erie, PA (US); Bhaskar Tamma, Bengaluru (IN); Ravichandra Srinivasa Jupudi, Bengaluru (IN); Kevin Paul Bailey, Mercer, PA (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 20 days.

(21) Appl. No.: 16/252,641

(22) Filed: Jan. 20, 2019

(65) Prior Publication Data

US 2020/0232416 A1    Jul. 23, 2020

(51) Int. Cl.
  *F02F 3/26* (2006.01)
  *F02F 3/24* (2006.01)
  *F02F 3/28* (2006.01)

(52) U.S. Cl.
  CPC .............. *F02F 3/24* (2013.01); *F02F 3/26* (2013.01); *F02F 3/28* (2013.01)

(58) Field of Classification Search
  CPC ........ F02F 3/24; F02F 3/26; F02F 3/28; F02F 3/285
  See application file for complete search history.

(56) References Cited

U.S. PATENT DOCUMENTS

| | | | |
|---|---|---|---|
| 5,215,052 A | 6/1993 | Augustin | |
| 6,152,122 A | 11/2000 | Hampson et al. | |
| 7,431,012 B1 | 10/2008 | Glenn et al. | |
| 8,459,229 B2 | 6/2013 | Rothbauer et al. | |
| 8,499,735 B2 | 8/2013 | Eismark et al. | |
| 8,555,854 B2 | 10/2013 | Rothbauer et al. | |

(Continued)

FOREIGN PATENT DOCUMENTS

| | | |
|---|---|---|
| JP | 2017025929 A | 2/2017 |
| WO | 2017155519 A1 | 9/2017 |

OTHER PUBLICATIONS

John Gibble, "SuperTruck Powertrain Technologies for Efficiency Improvement", Volvo Technology of America, pp. 1-24, Jun. 10, 2016.

(Continued)

*Primary Examiner* — Jacob M Amick
(74) *Attorney, Agent, or Firm* — Christopher R. Carroll; The Small Patent Law Group LLC

(57) ABSTRACT

A piston crown for a combustion system is disclosed. The piston crown includes a piston bowl having a circumferential recess and a plurality of first recesses arranged spaced apart from each other along a circumferential direction. The circumferential recess is disposed proximate to a circumference of the piston crown. Each recess of the plurality of the first recesses extends between a center of the piston crown and the circumferential recess, and a width and a depth of each recess of the plurality of first recesses are extended along a radial direction for an entire length of each recess of the plurality of first recesses.

23 Claims, 18 Drawing Sheets

(56) References Cited

U.S. PATENT DOCUMENTS

| | | |
|---|---|---|
| 9,091,199 B2 | 7/2015 | Straub |
| 9,267,422 B2 | 2/2016 | Straub |
| 9,611,806 B2 | 4/2017 | Subatch, Jr. et al. |
| 9,695,723 B2 | 7/2017 | Record et al. |
| 2013/0047950 A1 | 2/2013 | Eismark et al. |
| 2015/0308371 A1* | 10/2015 | Eismark .............. F02B 23/0627 |
| | | 123/193.6 |
| 2018/0100466 A1 | 4/2018 | Bowditch et al. |
| 2018/0119603 A1* | 5/2018 | John .......................... F02F 3/24 |
| 2020/0011267 A1* | 1/2020 | Kanzaki .............. F02B 23/0648 |
| 2020/0095920 A1* | 3/2020 | Svensson ............ F02B 23/0693 |

OTHER PUBLICATIONS

Zha et al., "Piston Geometry Effects on Fuel-Air Mixture Preparation in a Light-Duty Optical Diesel Engine", U.S. Department of Energy Office of Scientific and Technical Information, 2016.

* cited by examiner

PISTON CROWN FOR A COMBUSTION SYSTEM AND AN ASSOCIATED METHOD THEREOF

BACKGROUND

Embodiments of the present specification relate to a combustion system, and more particularly, to a piston crown for the combustion system and an associated method of controlling combustion of fuel in the combustion system.

Designers of combustion systems for internal combustion (IC) engines have been confronted with stringent requirements relating to fuel economy and exhaust emissions. With the IC engines, such as compression ignition engines, commonly called "diesel" engines, certain exhaust emission components including oxides of nitrogen ($NO_x$), and soot (particulate matter) are more difficult to control. In certain combustion system, $NO_x$ may be reduced by lowering peak flame temperature in the IC engines. However, this may increase the soot emissions of the IC engines. Further, $NO_x$ may be controlled in some IC engines by retarding injection timing. However, this may have the effect of increasing fuel consumption. Certain other combustion systems may utilize an exhaust aftertreatment device to reduce emissions. However, the exhaust aftertreatment device may add to maintenance and overall costs of the IC engine. Thus, the core challenge is to control the diesel combustion event to provide the best trade-off between the fuel efficiency and targeted emissions. Accordingly, there is a need for an improved combustion system and an associated method for controlling combustion of fuel in the combustion system.

SUMMARY

In accordance with one embodiment of the present specification, a piston crown for a combustion system is disclosed. The piston crown includes a piston bowl having a circumferential recess disposed proximate to a circumference of the piston crown, and a plurality of first recesses arranged spaced apart from each other along a circumferential direction. Each recess of the plurality of the first recesses extends between a center of the piston crown and the circumferential recess, and a width and a depth of each recess of the plurality of first recesses are extended along a radial direction for an entire length of each recess of the plurality of first recesses.

In accordance with another embodiment of the present specification, a piston crown for a combustion system is disclosed. The piston crown includes a piston bowl having a plurality of recesses arranged spaced apart from each other along a circumferential direction. Each recess of the plurality of recesses extends between a center and a circumference of the piston crown, wherein a width and a depth of each recess of the plurality of recesses are varied along a radial direction for an entire length of each recess of the plurality of recesses. The depth of each recess of the plurality of recesses is further varied along the circumferential direction.

In accordance with yet another aspect of the present specification, a piston crown for a combustion system is disclosed. The piston crown includes a piston bowl having a plurality of protrusions arranged spaced apart from each other along a circumferential direction, where each protrusion of the plurality of protrusions is disposed between a center and a peripheral wall of the piston bowl.

BRIEF DESCRIPTION OF THE DRAWINGS

These and other features and aspects of embodiments of the present specification will become better understood when the following detailed description is read with reference to the accompanying drawings in which like characters represent like parts throughout the drawings, wherein.

DETAILED DESCRIPTION

Embodiments discussed herein disclose a piston crown and a combustion system for an internal combustion (IC) engine having the piston crown. In some embodiments, the piston crown is detachably coupled to a piston skirt, thereby providing an option to retrofit the piston crown to a piston. In some other embodiments, the piston crown and the piston skirt are integrated to one another to form a unitary piston. In certain embodiments, the piston crown is configured to provide in-cylinder solutions for controlling combustion of fuel to notably reduce soot (particulate matter). In certain example embodiments, various designs of the piston crown as discussed herein may be used for controlling combustion of the fuel, thereby regulate emission and improve fuel efficiency of the IC engine. Further, the combustion system may not require an exhaust aftertreatment device, thus reducing the packaging challenges, potential reliability issues associated with the exhaust aftertreatment device, and also reducing the cost and complexity of the combustion system.

Figure 1:
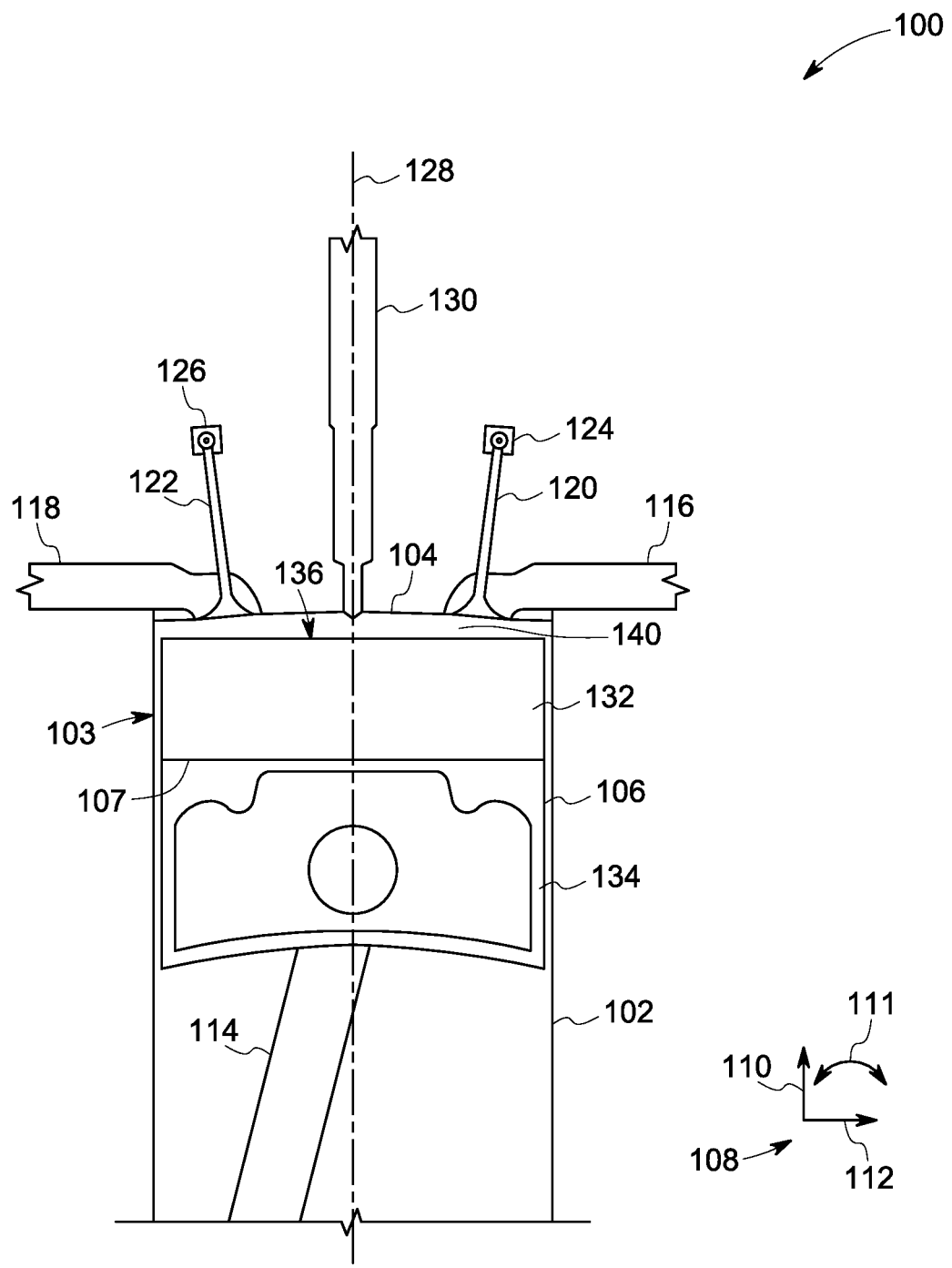
FIG. 1 illustrates a schematic diagram of a combustion system, in accordance with one embodiment of the present disclosure.

FIG. 1 shows a schematic diagram of a combustion system 100 for an engine, for example, an internal combustion engine (i.e., IC engine 103) in accordance with one embodiment. In some embodiments, the combustion system 100 includes a cylinder 102 (at least one cylinder), a piston 106 (at least one piston), and a fuel injector 130 (at least one fuel injector). In some other embodiments, the combustion system 100 may include a plurality of cylinders, for example, first cylinders that are not configured deliver exhaust gas recirculation and/or second cylinders that are configured to provide exhaust gas recirculation (not shown in FIG. 1) and other corresponding components, such as a plurality of pistons and a plurality of fuel injectors, and the like. It should be noted herein that the term "at least one cylinder" and "cylinder", "at least one piston" and "piston", and "at least one fuel injector" and "fuel injector" may be used interchangeably. Further, the coordinate axes 108 includes axes extending along a longitudinal direction 110, a circumferential direction 111, and a radial direction 112 of the combustion system 100.

In some embodiments, the cylinder 102 may be defined by a block of metal having at least one cylindrical aperture formed therein for receiving the piston 106. The cylinder 102 has a central axis 128 and includes a cylinder head 104 at a top with respect to the vertical axis or longitudinal direction 110 of the cylinder 102. In one or more embodiments, the cylinder 102 is configured to receive intake air from an intake passage 116 and release combustion gases to an exhaust passage 118. The intake passage 116 may be coupled to an intake manifold (not shown) of the IC engine 103, and the exhaust passage 118 may be coupled to an exhaust manifold (not shown) of the IC engine 103. In some embodiments, the intake passage 116 and the exhaust passage 118 selectively communicates with the cylinder 102 by an intake valve 120 and an exhaust valve 122 respectively. In the illustrated embodiment, the intake valve 120 and the exhaust valve 122 are positioned within the cylinder head 104 and at the top of the cylinder 102. Further, the intake valve 120 and the exhaust valve 122 are controlled by cam actuation systems 124, 126 respectively.

In the illustrated embodiment, the fuel injector 130 is a single fuel injector. In some embodiments, the fuel injector 130 may be a multi-fuel injector, which may be configured to spray/inject multiple fuels, for example, direct-injection of both natural gas and diesel into the cylinder 102. In the embodiment of FIG. 1, the fuel injector 130 is coupled to the cylinder 102 and configured to inject fuel, for example, diesel directly therein. In the illustrated embodiment, the fuel injector 130 is shown with a fuel nozzle extending into a central portion of a combustion chamber 140 of the cylinder 102, where the fuel nozzle includes at least one hole (not shown) for injecting fuel into the cylinder 102 and/or to a plurality of recesses (not shown) formed in a piston crown 132 of the piston 106. In some embodiments, the fuel injector 130 may include multiple holes at an end of the fuel nozzle, where at least one hole among the multiple holes may be aligned with at least one recess of the plurality of recesses for injecting/spraying the fuel into the at least one recess. In some embodiments, the fuel is diesel fuel that is combusted in the IC engine 103 through compression ignition. In some other non-limiting embodiments, the fuel may be natural gas, and/or gasoline, kerosene, biodiesel, or other petroleum distillates of similar density, that may be combusted in the IC engine 103 through compression ignition (and/or spark ignition). In the illustrated embodiment, the fuel injector 130 is positioned axially, with respect to the vertical axis or longitudinal direction 110 and centered along the central axis 128. In certain other embodiments, the fuel injector 130 may be inclined with respect to the longitudinal direction 110 and may offset from the central axis 128, depending on design requirements and such variations should not be construed as a limitation of the present disclosure. As it would be obvious to one skilled in the art, if the fuel injector is not centrally located at the central axis 128 of the cylinder 102, a central juncture of the plurality of recesses formed in the piston crown 132 may be indexed to be located for proper alignment with the fuel injector 130. Such a configuration of the fuel injector may be applicable for all designs of the piston crown 132 discussed herein. For an offset injector the plurality of recesses may no longer extend from between a center of to the circumference of the piston crown 132. The pattern of recesses may be substantially similar, but the central point of symmetry may be located under the fuel injector at the point of offset.

In the illustrated embodiment, the piston 106 is positioned within the cylinder 102 and centered along the central axis 128. The piston 106 has a cylindrical shape, and outer walls (not labeled) of the piston 106 contacts and slides against interior walls (not labeled) of the cylinder 102. In one or more embodiments, the piston 106 includes a piston crown 132 and a piston skirt 134. In the illustrated embodiment, the piston crown 132 and the piston skirt 134 are two separate components, which are coupled (e.g., mechanically joined, for example, via a welded joint 107) to each other to form the piston 106. In some embodiments, the piston crown 132 and the piston skirt 134 are integral components formed as one-piece piston, for example, as a unitary piston. In some other embodiments, the piston crown 132 and the piston skirt 134 are movably coupled to each other, such that the piston crown 132 is configured to maintain a constant volume of a combustion chamber, when the piston 106 reaches a bottom dead center. In one or more embodiments, the piston 106 may be configured to move vertically within the cylinder 102 with respect to the vertical axis or longitudinal direction 110. Further, the piston 106 may be coupled to a crankshaft (not shown) via a connecting rod 114 so that the reciprocating motion of the piston 106 is translated into the rotational motion of the crankshaft through the connecting rod 114. In some embodiments, the IC engine 103 is a four-stroke engine in which each of the cylinders 102 fires once in a firing order during two revolutions of the crankshaft. In some other embodiments, the IC engine 103 may be a two-stroke engine in which each of the cylinders 102 fires once in a firing order during one revolution of the crankshaft.

In one or more embodiments, the piston crown 132 includes a piston bowl 136 having a plurality of recesses and/or a circumferential recess (not shown in FIG. 1). In some embodiments, the plurality of recesses may be arranged spaced apart from each other along the circumferential direction 111 and the circumferential recess may be disposed proximate to the circumference of the piston crown. It should be noted herein that the plurality of recesses may have various shapes/designs for controlling combustion of the fuel, which are discussed in greater details below. In one or more embodiments, the combustion chamber 140 is formed between the piston crown 132, sides of the cylinder 102, and the cylinder head 104.

During operation of the combustion system 100, each cylinder 102 may undergo four-stroke cycle: i.e., the cycle includes an intake stroke, a compression stroke, an expansion stroke, and an exhaust stroke. During the intake stroke, the exhaust valve 122 closes and the intake valve 120 opens, thus allowing air to be introduced into the combustion chamber 140 via the intake passage 116 and move the piston 106 to bottom of the cylinder 102 so as to increase volume within the combustion chamber 140. The position at which the piston 106 is proximate to the bottom of the cylinder 102 and at the end of intake stroke (i.e., when the combustion chamber 140 is at its largest volume) is typically referred to as bottom dead center (BDC). During the compression stroke, the intake valve 120 and the exhaust valve 122 are closed. The piston 106 moves toward the cylinder head 104 so as to compress the air within the combustion chamber 140. The position at which the piston 106 is at the end of compression stroke and closest to the cylinder head 104 (i.e., when the combustion chamber 140 is at its smallest volume) is typically referred to as top dead center (TDC). At that stage, the fuel injector 130 injects fuel directly into the combustion chamber 140. In certain embodiments, the fuel injector 130 directs the fuel into one or more regions defined by the piston bowl 136. Thus, allowing the combustion of the fuel and compressed air to produce combustion gases (i.e., combusted air-fuel mixture). During the expansion stroke, the combustion gases push the piston 106 back to the BDC position. The crankshaft converts the linear movement of the piston 106 into a rotational torque of the rotary shaft. Finally, during the exhaust stroke, the exhaust valve 122 opens to release the combustion gases to the exhaust passage 118 and the piston 106 returns to TDC. It should be noted herein that the above description merely is an example and should not be construed as a limitation of the present disclosure.

In one or more embodiments, the piston bowl 136 having varied designs/shapes (as discussed below) may i) constrain the combustion of the fuel at an initial stage of fuel spray development so as to reduce NOx and ii) rapidly combust the fuel and oxidize soot (i.e., particulate matter generated during the initial stage) at a later stage. Thus, the piston bowl 136 may reduce the emissions (i.e., particulate matter and NOx) and specific fuel consumption.

Figure 2A:
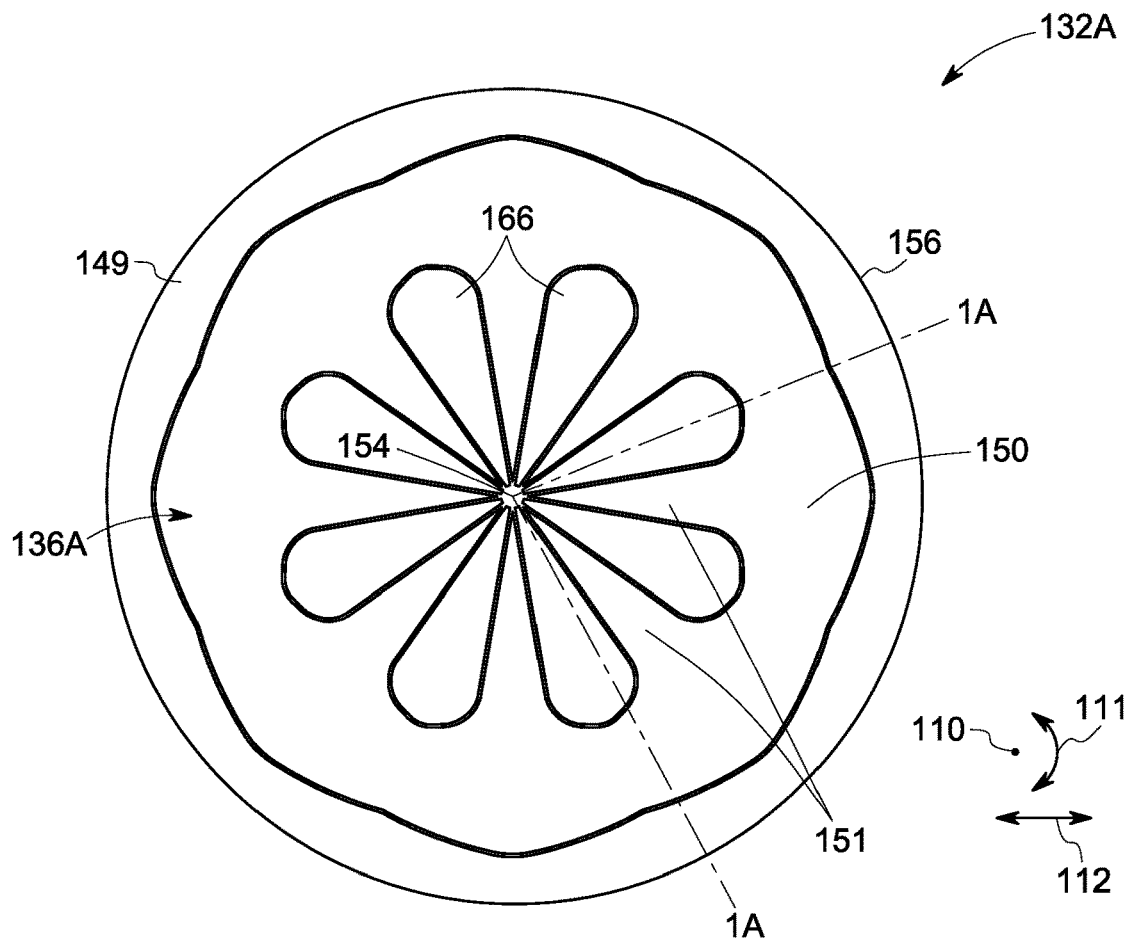
FIG. 2A illustrates an isometric view of a piston crown, in accordance with one embodiment of the present disclosure.
Figure 2B:
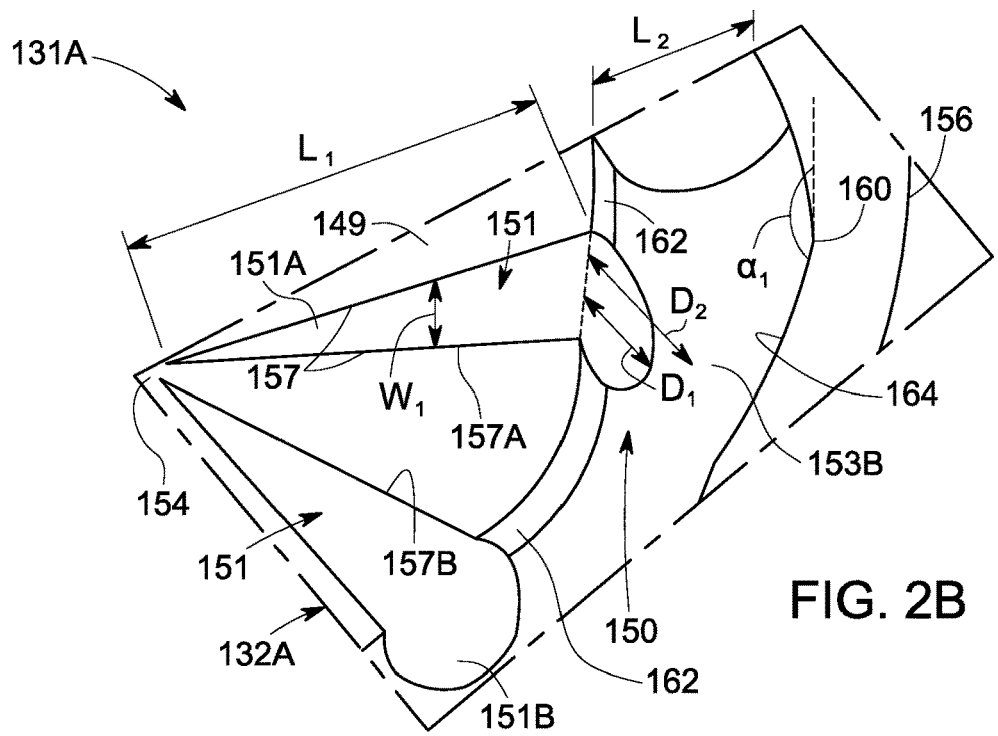
FIG. 2B illustrates a schematic diagram of a portion of the piston crown taken along a sector 1A-1A of FIG. 2A, in accordance with one embodiment of the present disclosure.

FIG. 2A shows an isometric view of a piston crown 132A in accordance with one embodiment. FIG. 2B shows a schematic diagram of a portion 131A of the piston crown 132A taken along a sector 1A-1A of FIG. 2A in accordance with one embodiment. The piston crown 132A is a cylindrical component having a top side 149 and a bottom side (not shown) located opposite to the top side 149. In certain embodiments, the top side 149 of the piston crown 132A is configured to face the cylinder head 104 (as shown in FIG. 1). The bottom side of the piston crown 132A may have a flat surface coupled to the piston skirt 134 (as shown and discussed in the embodiment of FIG. 1). In one or more embodiments, a piston bowl 136A is formed on the top side 149 of the piston crown 132A. The piston bowl 136A includes a circumferential recess 150 and a plurality of first recesses 151. In one embodiment, the circumferential recess 150 is disposed proximate to a circumference 156 of the piston crown 132A, and the plurality of first recesses 151 is arranged spaced apart from each other along the circumferential direction 111. Specifically, each recess of the plurality of first recesses 151 between a center 154 of the piston crown 132A and the circumferential recess 150. It should be noted herein that the plurality of first recesses 151 may also be referred herein as "a plurality of radial recesses". Further, it should be noted herein that the circumferential recess 150 extends 360 degrees on the top side 149 of the piston crown 132A. In the illustrated embodiment of FIGS. 2A and 2B, the piston bowl 136A includes eight first recesses and one circumferential recess.

In one embodiment, each recess of the plurality of first recesses 151 has a width "$W_1$" and a depth "$D_1$" (shown in FIG. 2B). In some embodiments, the width "$W_1$" and the depth "$D_1$" are varied along the radial direction 112 for an entire length "$L_1$" of each recess of the plurality of first recesses 151. In the example embodiment of FIG. 2, the width "$W_1$" and the depth "$D_1$" are extended (or increased) from the center 154 towards the circumferential recess 150. Each recess of the plurality of first recesses 151 is defined by a pair of side walls 157 diverging from the center 154 to the circumferential recess 150. In the illustrated embodiment, the pair of side walls 157 are straight walls extending tangentially along the radial direction 112. It should be noted herein that the piston bowl 136A includes a plurality of pairs of side walls 157 spaced apart and separated from one another by a non-recessed portion 166 of the piston crown 132A. The circumferential recess 150 has a depth "$D_2$" (shown in FIG. 2B). In some embodiments, the depth "$D_2$" is varied along the radial direction 112 for an entire length "$L_2$" of the circumferential recess 150. In the example embodiment, the depth "$D_2$" of the circumferential recess 150 is greater than the depth "$D_1$" of each recess of the plurality of first recesses 151. The circumferential recess 150 is defined by a peripheral wall 160 disposed proximate to the circumference 156 and extending along the circumferential direction 111, and a plurality of intermediate walls 162 spaced apart from the peripheral wall 160. Specifically, each wall of the plurality of intermediate walls 162 extends between mutually opposite side walls 157A, 157B of adjacent recesses 151A, 151B of the plurality of first recesses 151. Each recess of the plurality of first recesses 151 is a channel like-structure having an opened-half conical shaped profile. The piston bowl 136A includes a reentrant lip 164 disposed on the peripheral wall 160. In one embodiment, the reentrant lip 164 may be an integral portion of the peripheral wall 160. In some other embodiments, the reentrant lip 164 may be separate component, which may be coupled to the peripheral wall 160. In one embodiment, the reentrant lip 164 is inclined at a reentrancy angle "$\alpha_1$" relative to the longitudinal direction 110 (in other words a straight line extending perpendicular to the radial direction 112).

During operation of the combustion system 100, a fuel injector 130 (as shown in FIG. 1) may be configured to distribute fuel based on a number of the plurality of first recesses 151 formed in the piston crown 132B and inject the fuel into combustion chamber 140 (as shown in FIG. 1). Specifically, the fuel injector 130 is configured to direct the fuel along the plurality of first recesses 151 to initially constrain the fuel with less quantity of air for the combustion of the fuel. The constraining of the fuel for the combustion of the fuel may result in formation of a large quantity of soot (particulate matter) at substantially the same level of NOx and reduced initial apparent heat release rate (i.e., HRR). Further, the fuel and/or the particulate matter (i.e., reacting plumes) are directed towards the circumferential recess 150, where the reacting plumes are exposed to an unutilized quantity of air for rapid combustion/oxidation of the reacting plumes to substantially complete the combustion, thereby increasing the apparent HRR. Thus, the piston crown 132A may provide in-cylinder solutions for reducing emissions and specific fuel consumption by the IC engine 103 (as shown in FIG. 1), while maintaining the same amount of power output from the IC engine 103. Further, the reentrant lip 164 disposed on the peripheral wall 160 may guide any remaining unburned portion of the reacting plumes into a squish region (not labeled) of the combustion chamber 140 for completing the combustion of the remaining unburned portion of the reacting plumes. It should be noted herein that non-recessed portion 166 of the piston crown 132A may be a portion of the squish region. In certain embodiments, the reentrant lip 164 may prevent heating/burning related damages caused to combustion liners that are disposed at the circumference 156 of the piston crown 132A.

Figure 3:
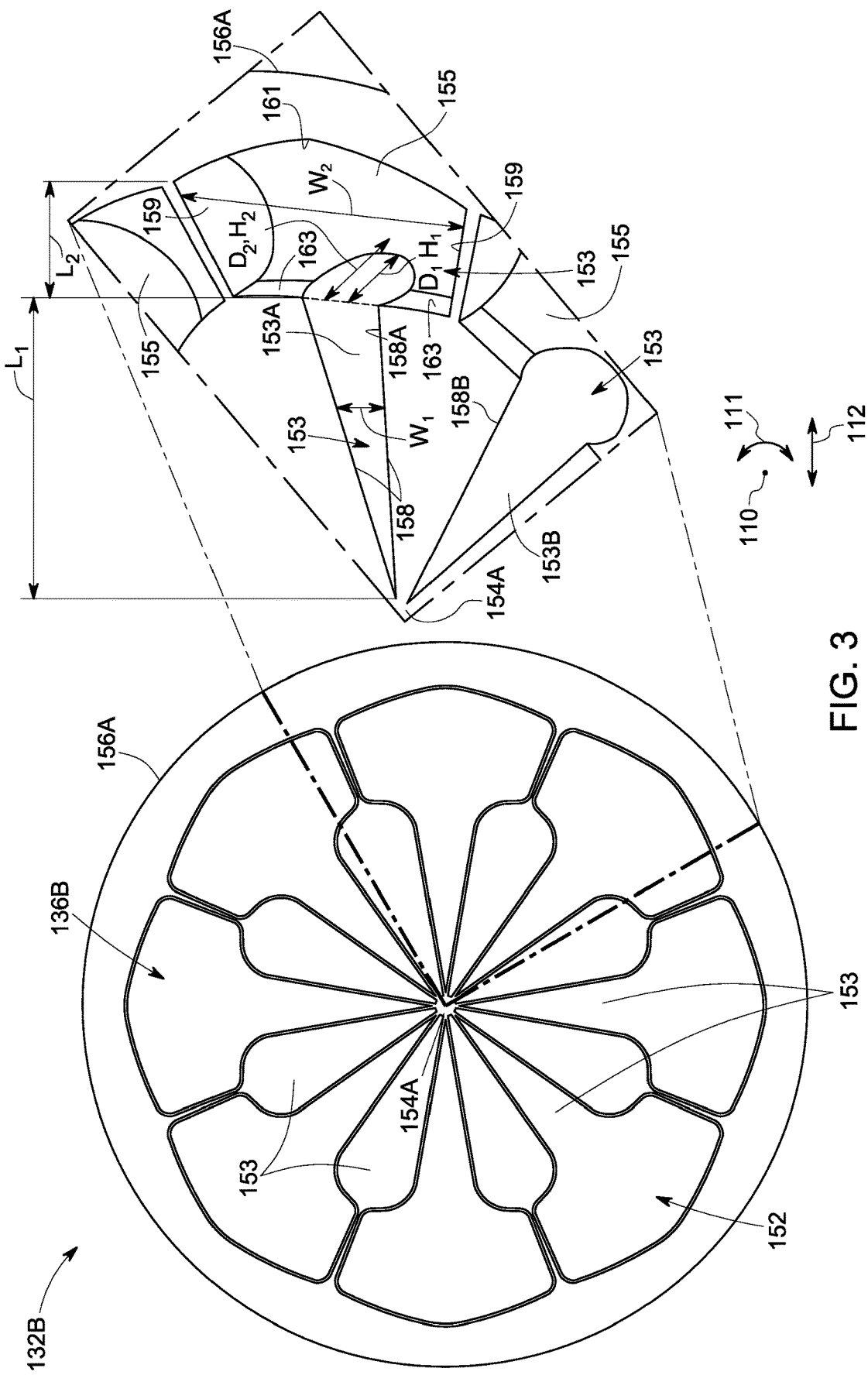
FIG. 3 illustrates an isometric view of a piston crown, in accordance with another embodiment of the present disclosure.

FIG. 3 shows an isometric view of a piston crown 132B in accordance with another embodiment. In one or more embodiments, a piston bowl 136B is formed on a top side (not labeled) of the piston crown 132B. In some embodiments, the piston bowl 136B includes a circumferential recess 152 and a plurality of first recesses 153. Each recess of the plurality of first recesses 153 is defined by a pair of side walls 158 diverging from a center 154A of the piston crown 132B to the circumferential recess 152. Similarly, the circumferential recess 152 is defined by a peripheral wall 161 extending along a circumferential direction 111 of the piston crown 132B and disposed proximate to the circumference 156A, and a plurality of intermediate walls 163 spaced apart from the peripheral wall 160. Each wall of the plurality of intermediate walls 163 extends between mutually opposite side walls 158A, 158B of adjacent recesses 153A, 153B of the plurality of first recesses 153. In the illustrated embodiment, the pair of side walls 158 are straight walls extending along a radial direction 112.

The piston crown 132B is substantially similar to the piston crown 132A discussed in the embodiment of FIG. 2, except that the piston bowl 136B includes a plurality of second side walls 159 disposed in the circumferential recess 152 and spaced apart from each other along the circumferential direction 111 to form a plurality of second recesses 155. Specifically, each wall of the plurality of second side walls 159 extends along the radial direction 112 between one intermediate wall of the plurality of intermediate walls 163 and the peripheral wall 161. In the illustrated embodiment, each wall of the plurality of second side walls 159 is straight walls, which extends along the radial direction 112. Further, each wall of the plurality of intermediate walls 163 is a curved wall extending along the circumferential direction 111. In the illustrated embodiment, each recess of the plurality of second recesses 155 is connected to at least one recess of the plurality of first recesses 153. In such example embodiments, a combination of at least one recess of the plurality of first recesses 153 and at least one recess of the plurality of second recesses 155 are discrete recesses. Further, the piston bowl 136B includes eight first recesses and second recesses, which divide the piston crown 132B into eight sectors.

In one embodiment, each recess of the plurality of first recesses 153 has a width "$W_1$" and a depth "$D_1$". In some embodiments, the width "$W_1$" and the depth "$D_1$" are varied along the radial direction 112 for an entire length "$L_1$" of each recess of the plurality of first recesses 153. In the example embodiment of FIG. 3, the width "$W_1$" and the depth "$D_1$" are extended from the center 154A towards the circumference 156A. Further, each recess of the plurality of second recesses 155 has a width "$W_2$" and a depth "$D_2$". In some embodiments, the width "$W_2$" and the depth "$D_2$" are varied along the radial direction 112 for an entire length "$L_2$" of each recess of the plurality of second recesses 155. In the example embodiment of FIG. 3, the width "$W_2$" and the depth "$D_2$" are extended from the plurality of first recesses 153 towards the circumference 156A. In the example embodiment, the depth "$D_2$" of the plurality of second recesses 155 is greater than the depth "$D_1$" of the plurality of first recesses 153. In one embodiment, each wall of the pair of first side wall portions 158A has a first height "$H_1$" and each wall of the pair of the second side wall portions 158B has a second height "$H_2$". In the illustrated embodiment, the first height "$H_1$" and the second height "$H_2$" and substantially same. Further, each of the plurality of first recesses 153 is a channel like-structure having an opened-half conical shaped profile. As discussed in the embodiment of FIG. 2. the piston bowl 136B may further include a reentrant lip disposed on the peripheral wall 161.

During operation of the combustion system 100, a fuel injector 130 (as shown in FIG. 1) may be configured to distribute fuel based on number of the plurality of first recesses 153 and inject the fuel into combustion chamber 140 (as shown in FIG. 1). Specifically, the fuel injector 130 is configured to direct the fuel along the plurality of first recesses 153, where the fuel is initially constrained with less quantity of air for the combustion of the fuel. The constraining of the fuel for the combustion of the fuel may result in formation of a large quantity of soot (particulate matter) at substantially the same level of NOx and reduced initial apparent heat release rate (i.e., HRR). Further, the fuel and/or the particulate matter (i.e., reacting plumes) are directed towards the plurality of second recesses 155, where the reacting plumes are exposed to an unutilized quantity of air for rapid combustion/oxidation of the reacting plumes to substantially complete the combustion, thereby increasing the apparent HRR. Thus, the piston crown 132B may provide in-cylinder solutions for reducing emissions and specific fuel consumption by the IC engine 103 (as shown in FIG. 1), while maintaining the same amount of power output from the IC engine 103. Further, the reentrant lip may guide any remaining unburned portion of the reacting plumes into a squish region (as discussed in FIGS. 2A and 2B) of the combustion chamber 140 for completing the combustion of the remaining unburned portion of the reacting plumes.

Figure 4:
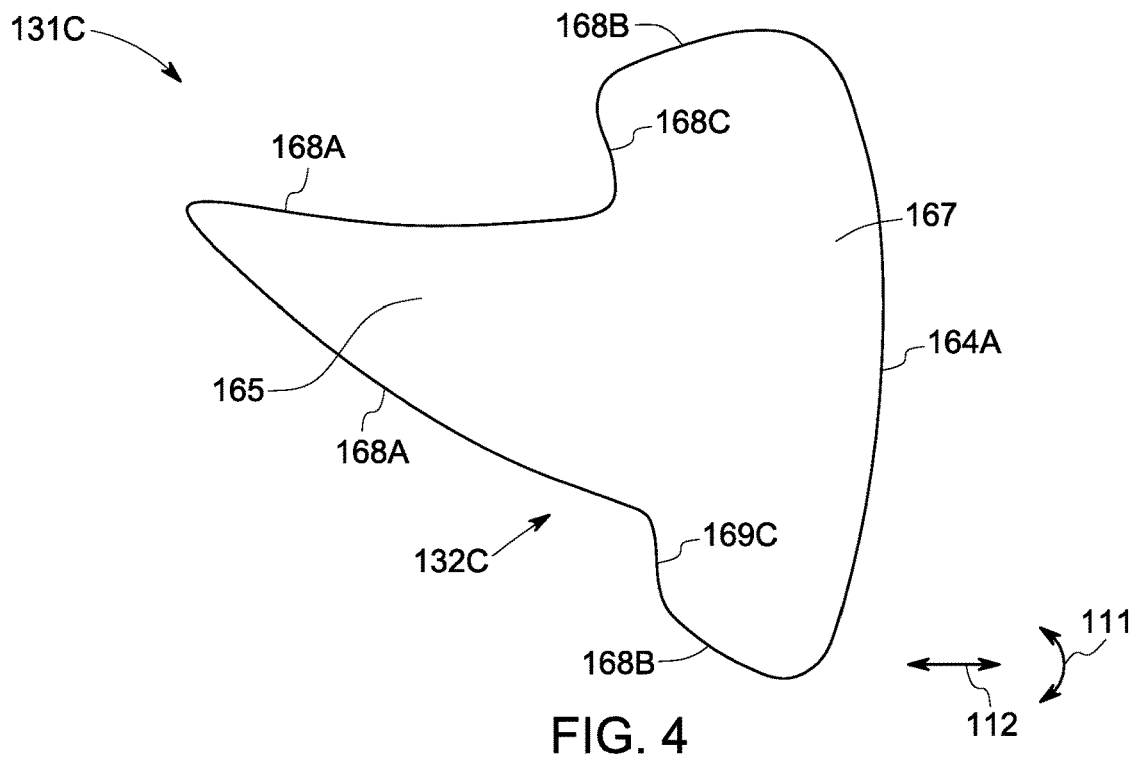
FIG. 4 illustrates a schematic diagram of a portion of a piston crown in accordance with yet another embodiment of the present disclosure.

FIG. 4 shows a schematic diagram of a portion 131C of a piston crown 132C in accordance with yet another embodiment. The portion 131C includes a first recess 165 and a second recess 167. The piston crown 132C is substantially similar to a piston crown 132B discussed in the embodiment of FIG. 3, except that a pair of first side wall portions 168A defining the first recess 165 is a curved side wall relative to a radial direction 112. Similarly, a plurality of second side walls 168B of the second recess 167 is a curved side wall relative to the radial direction 112. Further, in the illustrated embodiment, each of a plurality of intermediate walls 169A is a curved intermediate wall. In one embodiment, each wall of the pair of first walls 168A has different radius of curvature relative to the radial direction 112 (in other words relative to a straight line extending along the radial direction 112 from a center of the piston crown 132C).

Figure 5:
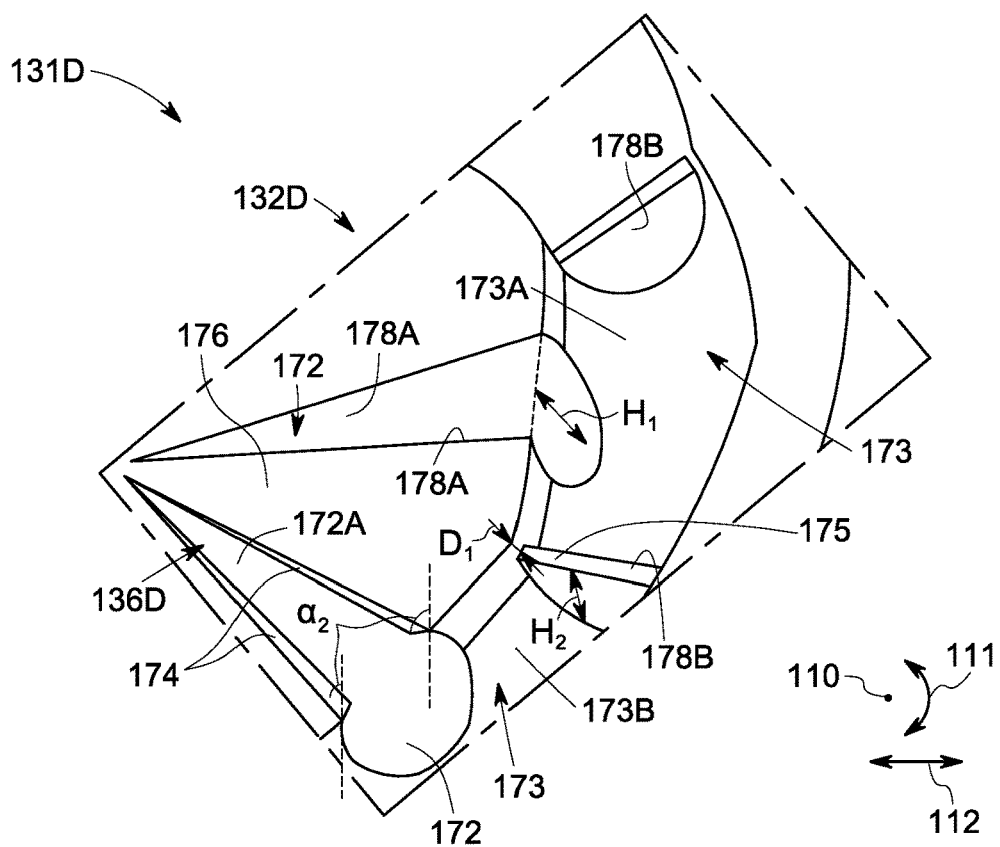
FIG. 5 illustrates an isometric view of a portion of a piston crown, in accordance with yet another embodiment of the present disclosure.

FIG. 5 shows an isometric view of a portion 131D of a piston crown 132D in accordance with yet another embodiment. The portion 131D includes a plurality of first recesses 172 and a plurality of second recesses 173. It should be noted herein that the piston crown 132D is substantially similar to a piston crown 132B discussed in the embodiment of FIG. 3, except that a pair of first side wall portions 178A has a first height "$H_1$" and a pair of second side wall portions 178B has a second height "$H_2$", where the second height "$H_2$" is different from the first height "$H_1$". Specifically, the second height "$H_2$" is smaller than the first height "$H_1$". More specifically, a top side 175 (i.e., surface) of each wall of the pair of second side wall portions 178B is offset by a distance "$D_1$" from a top side 176 (i.e., surface) of the piston crown 132D. The pair of second side wall portions 178B having the smaller second height "$H_2$" allows the combustion flames (or plumes) to interact between the two mutually adjacent second recesses, for example, between the second recess 173A and the second recess 173B. The piston crown 132D further includes reentrant lips 174 disposed on the pair of first side wall portions 178A of at least one recess, for example, the first recess 172A. In one embodiment, each of the reentrant lips 174 is inclined at a reentrancy angle "$\alpha_2$" relative to the longitudinal direction 110.

Figure 6A:
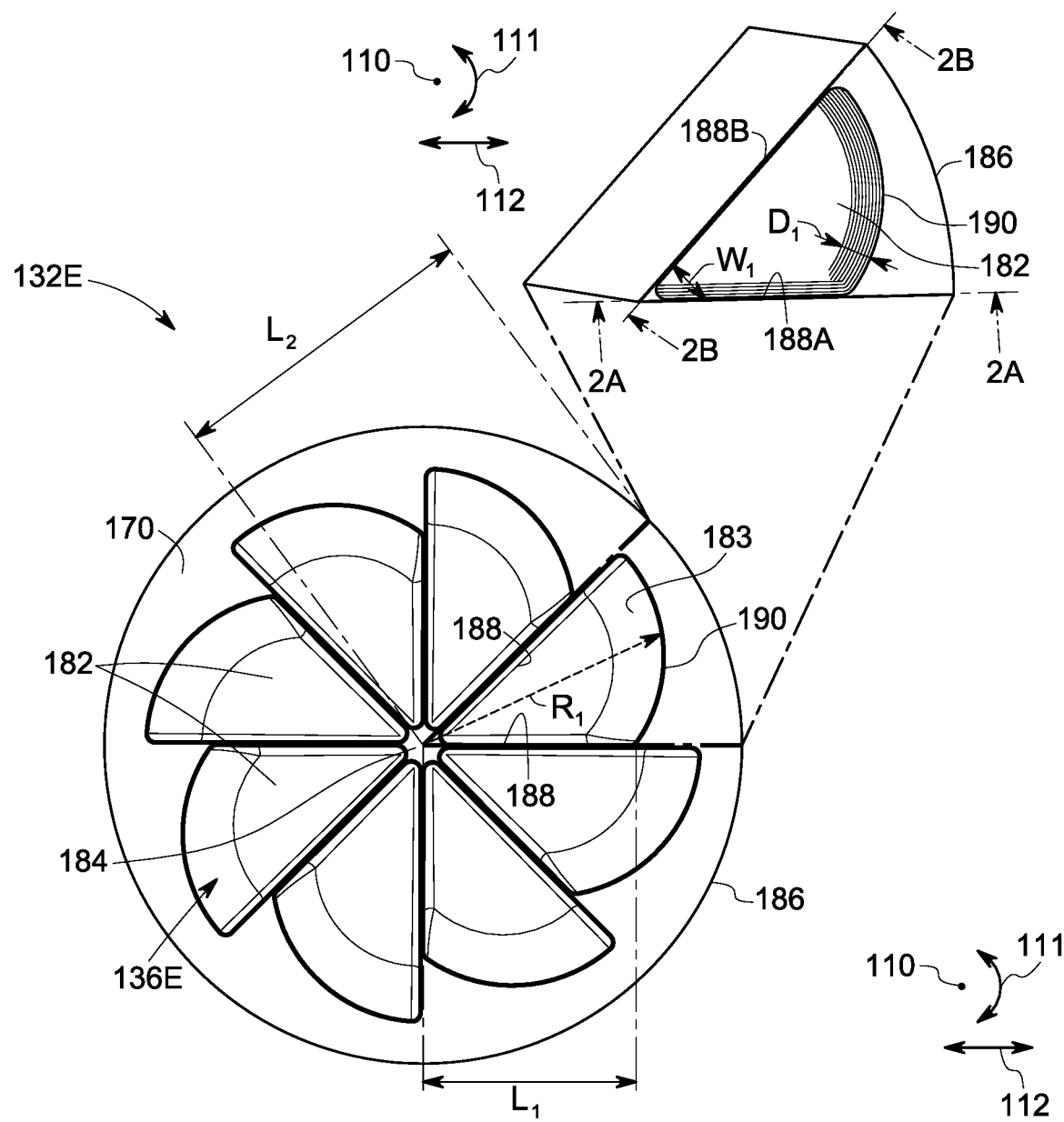
FIG. 6A illustrates an isometric view of a piston crown, in accordance with one embodiment of the present disclosure.
Figure 6B:
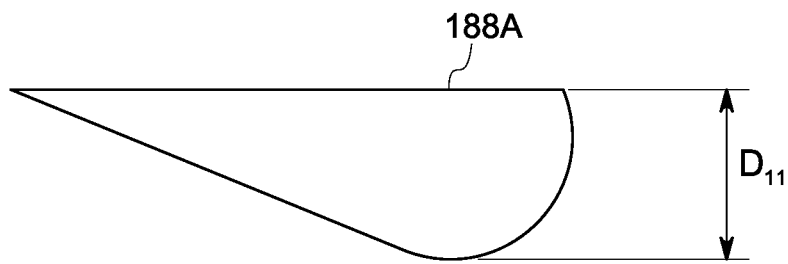
FIG. 6B illustrates a schematic diagram of one recess of a plurality of recesses taken along a line 2A-2A of FIG. 6A, in accordance with one embodiment of the present disclosure.
Figure 6C:
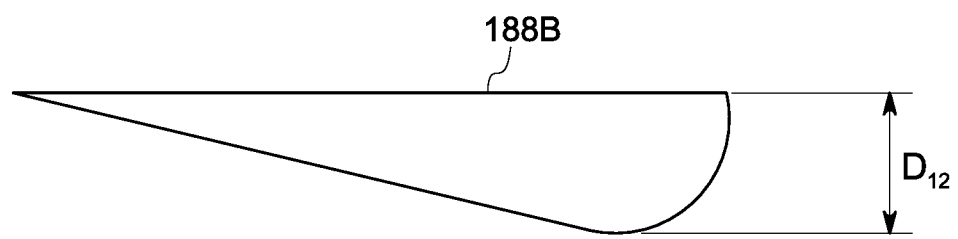
FIG. 6C illustrates a schematic diagram of one recess of a plurality of recesses taken along a line 2B-2B of FIG. 6A, in accordance with one embodiment of the present disclosure.

FIG. 6A shows an isometric view of a piston crown 132E in accordance with one embodiment. FIG. 6B shows a schematic diagram of one recess of a plurality of recesses 182 taken along a line 2A-2A of FIG. 6A in accordance with one embodiment. FIG. 6C shows a schematic diagram of one recess of a plurality of recesses 182 taken along a line 2B-2B of FIG. 6A in accordance with one embodiment. In one or more embodiments, a piston bowl 136E is formed on a top side 170 of the piston crown 132E. The piston bowl 136E includes a plurality of recesses 182 arranged spaced apart from each other along a circumferential direction 111. Specifically, each of the plurality of recesses 182 extends between a center 184 of the piston crown 132E and a circumference 186 of the piston crown 132E. In the illustrated embodiment, the plurality of recesses 182 are discrete recesses.

In one embodiment, each recess of the plurality of recesses 182 is defined by a pair of side walls 188 diverging from the center 184 towards the circumference 186 of the piston crown 132E, and a peripheral wall 190 extending between the pair of side walls 188 proximate to the circumference 186. Specifically, a first side wall 188A of the pair of side walls 188 has a first length "$L_1$" and a second side wall 188B of the pair of side walls 188 has a second length "$L_2$". In the illustrated embodiment, the first length "$L_1$" is smaller than the second length "$L_2$". Further, the peripheral wall 190 connecting the first side wall 188A and the second side wall 188B of the pair of side walls 188 is a curved wall. In one embodiment, each recess of the plurality of recesses 182 has varied radii "$R_1$" from the center 184.

In one embodiment, each recess of the plurality of recesses 182 has a width "$W_1$" and a depth "$D_1$", where the width "$W_1$" and the depth "$D_1$" are varied along the radial direction 112 for an entire length "$L_1$" of each recess of the plurality of recesses 182. Specifically, the width "$W_1$" is gradually extended (increased) from the center 184 till an end portion of first side wall 188A, and gradually decreased from the end portion of the first side wall 188A till an end portion of the second side wall 188B. Similarly, the depth "$D_1$" of each recess of the plurality of recesses 182 is extended from the center 184 towards the circumference 186. Further, the depth "$D_1$" of each recess of the plurality of recesses 182 is uniformly varied along the circumferential direction 111. For example, in the illustrated embodiment, each recess of the plurality of recesses 182 has a depth "$D_{11}$" proximate to the first wall 188A and has a depth "$D_{12}$" proximate to the second side wall 188B. In other words, the depth "$D_1$" is uniformly decreased from the first side wall 188A to the second side wall 188B along the circumferential direction 111. In one embodiment, each recess of the plurality of recesses 182 has a crest-wave shaped profile. The piston bowl 136E may further include a reentrant lip on the first side wall 188A, the second side wall 188B, or the peripheral wall 190, as discussed in the embodiments of FIGS. 2 and 5. In the illustrated embodiment, the first side wall 188a and the second side wall 188b are straight side walls extending tangentially towards the peripheral wall 190 along the radial direction 112. In some embodiments, the first side wall 188a and the second side wall 188b may be curved walls or sloped side walls, which may direct plumes upwards towards a combustion chamber or a squish region.

During operation of the combustion system 100, the fuel injector 130 (as shown in FIG. 1) is configured to inject fuel into combustion chamber 140 (as shown in FIG. 1). Specifically, the fuel injector 130 is configured to direct the fuel into a first region (i.e., a region parallel to the first side wall 188A), where the fuel is initially constrained with less quantity of air for the fuel to entrain, mix and combust. The initial constraining of the fuel may lower the heat release rate (i.e., HRR) in the early stage of the combustion, and may thus reduce NOx and soot oxidation. The peripheral wall 190 guides the fuel and/or the particulate matter (i.e., reacting plumes) to turn almost 90 degrees. Simultaneously, the reacting plumes are directed into a second region defined around the second side wall 188B, while rising up in a spiral path due to varied depth along the circumferential direction, into a squish region (not labeled) defined in the combustion chamber 140. Thus, the reacting plumes are opened-up to an unutilized quantity of air for rapid combustion/oxidation for substantial combustion of the reacting plumes, thereby increasing the apparent HRR, and reducing emissions and specific fuel consumption.

Figure 7A:
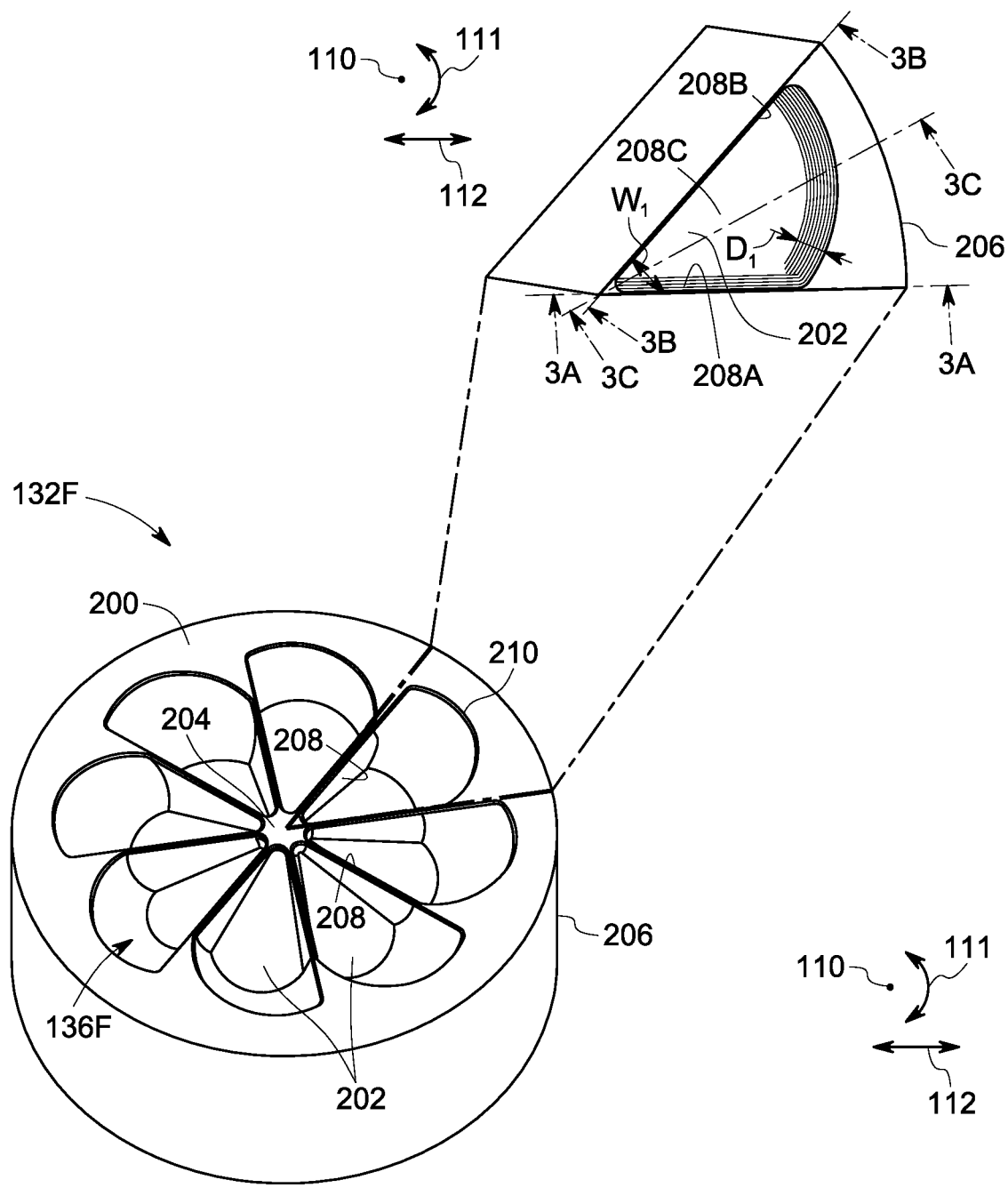
FIG. 7A illustrates an isometric view of a piston crown, in accordance with another embodiment of the present disclosure.
Figure 7B:
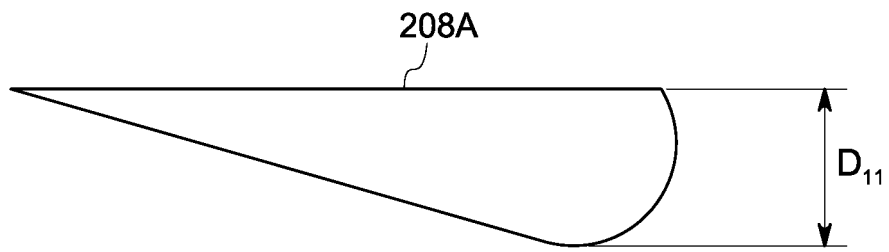
FIG. 7B illustrates a schematic diagram of one recess of a plurality of recesses taken along a line 3A-3A of FIG. 7A, in accordance with another embodiment of the present disclosure.
Figure 7C:
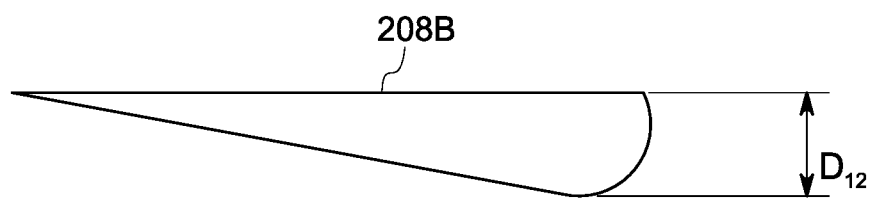
FIG. 7C illustrates a schematic diagram of one recess of a plurality of recesses taken along a line 3B-3B of FIG. 7A, in accordance with another embodiment of the present disclosure.
Figure 7D:
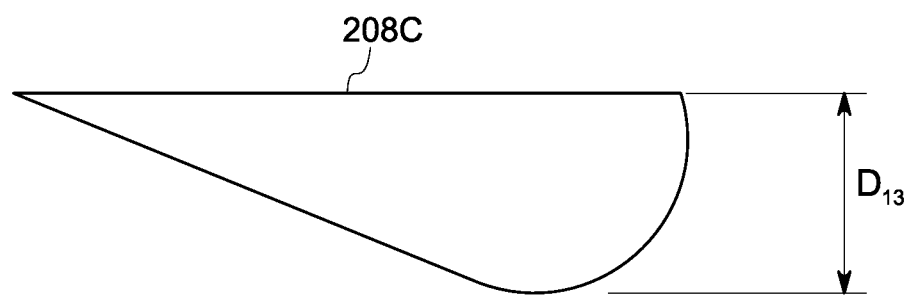
FIG. 7D illustrates a schematic diagram of one recess of a plurality of recesses taken along a line 3C-3C of FIG. 7A, in accordance with another embodiment of the present disclosure.

FIG. 7A shows an isometric view of a piston crown 132F in accordance with another embodiment. FIG. 7B shows a schematic diagram of one recess of a plurality of recesses 203 taken along a line 3A-3A of FIG. 7A in accordance with another embodiment. FIG. 7C shows a schematic diagram of one recess of a plurality of recesses 203 taken along a line 3B-3B of FIG. 7A in accordance with another embodiment. FIG. 7D shows a schematic diagram of one recess of a plurality of recesses 203 taken along a line 3C-3C of FIG. 7A in accordance with another embodiment. In one or more embodiments, a piston bowl 136F is formed on a top side 200 of the piston crown 132F. The piston bowl 136F includes a plurality of recesses 202 arranged spaced apart from each other along the circumferential direction 111. Specifically, each recess of the plurality of recesses 202 extends between a center 204 of the piston crown 132F and a circumference 206 of the piston crown 132F. In the illustrated embodiment, the plurality of recesses 202 are discrete recesses.

In one embodiment, each recess of the plurality of recesses 202 is defined by a pair of side walls 208 diverging from the center 204 towards the circumference 206 of the piston crown 132F, and a peripheral wall 210 extending between the pair of side walls 208 at the circumference 206.

It should be noted herein that the piston crown 132F is substantially similar to the piston crown 132E discussed in the embodiment of FIG. 6A, except that a depth "$D_1$" of each recess of the plurality of recesses 202 is i) increased (extended) from a first side wall 208A till a middle portion 208C of each recess of the plurality of recesses 202 and ii) decreased from the middle portion 208C till a second side wall 208B, along the circumferential direction 111. For example, in the illustrated embodiment, each recess of the plurality of recesses 202 has a depth "$D_{11}$" proximate to the first wall 208A, a depth "$D_{12}$" proximate to the second wall 208B, and depth "$D_{13}$" proximate to the middle portion 208C. In one embodiment, each recess of the plurality of recesses 202 has a crest-wave shaped profile. The piston bowl 136F may further include a reentrant lip on the first side wall 208A, the second side wall 208B, or the peripheral wall 210, as discussed in the embodiments of FIGS. 2 and 5. Similar to the embodiment of FIG. 6A, each recess of the plurality of recesses 202 having varied depth along the circumferential direction 111 may aid in spreading the combusting flame as the reacting plumes reaches from the first side wall 208A to the second side wall 208B. Accordingly, the piston crown 132F may provide in-cylinder solutions for reducing emissions and specific fuel consumption by the IC engine, while maintaining the same amount of power output from the IC engine.

Figure 8A:
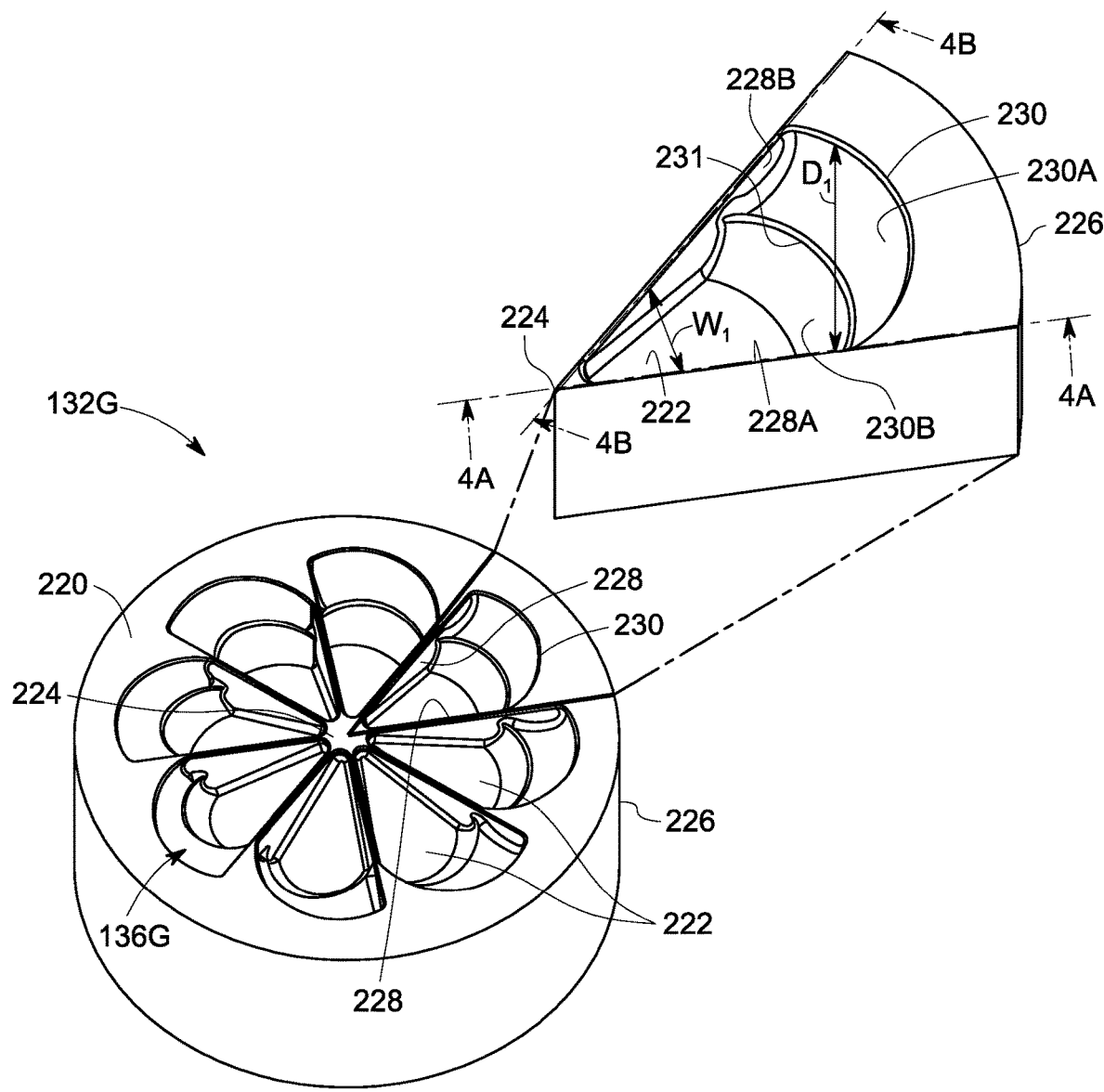
FIG. 8A illustrates an isometric view of a piston crown, in accordance with yet another embodiment of the present disclosure.
Figure 8B:
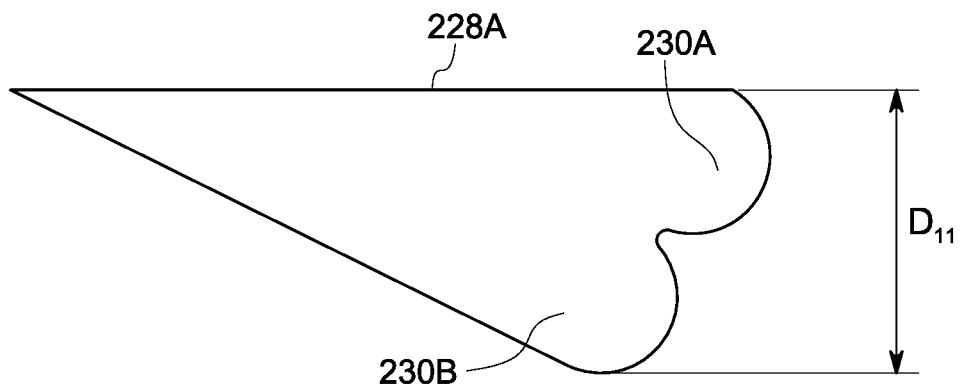
FIG. 8B illustrates a schematic diagram of one recess of a plurality of recesses taken along a line 4A-4A of FIG. 8A, in accordance with yet another embodiment of the present disclosure.
Figure 8C:
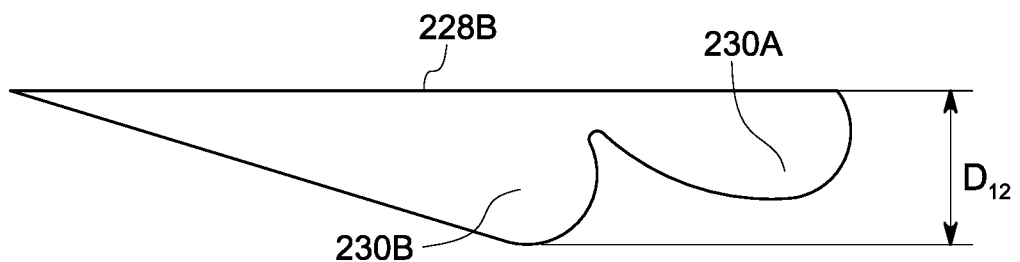
FIG. 8C illustrates a schematic diagram of one recess of a plurality of recesses taken along a line 4B-4B of FIG. 8A, in accordance with yet another embodiment of the present disclosure.

FIG. 8A shows an isometric view of a piston crown 132G in accordance with yet another embodiment of the present disclosure. FIG. 8B shows a schematic diagram of one recess of a plurality of recesses 222 taken along a line 4A-4A of FIG. 8A in accordance with yet another embodiment. FIG. 8C shows a schematic diagram of one recess of a plurality of recesses 222 taken along a line 4B-4B of FIG. 8A in accordance with yet another embodiment. In one or more embodiments, a piston bowl 136G is formed on a top side 220 of the piston crown 132G. The piston bowl 136G includes a plurality of recesses 222 arranged spaced apart from each other along the circumferential direction 111. Specifically, each recess of the plurality of recesses 222 extends between a center 224 of the piston crown 132G and a circumference 226 of the piston crown 132G. In the illustrated embodiment, the plurality of recesses 222 are discrete recesses.

In one embodiment, each recess of the plurality of recesses 222 is defined by a pair of side walls 228 diverging from the center 224 towards the circumference 226 of the piston crown 132G, and a peripheral wall 230 extending between the pair of side walls 228 proximate to the circumference 226.

It should be noted herein that the piston crown 132G is substantially similar to the piston crown 132E discussed in the embodiment of FIG. 6A, except that the peripheral wall 230 has a stepped peripheral wall 231 to form into two pockets, for example, a first pocket 230A and a second pocket 230B, along a length of the peripheral wall 230. Similar to the embodiment of FIG. 6A, each recess of the plurality of recesses 222 having the stepped peripheral wall 231 may aid in splitting the reacting plumes into multiple jets, where each jet has its own trajectory which spirals within and above/outside the first pocket 230A and the second pocket 230B. Thereby, directing the reacting plumes to regions of unburned air for increasing the heat release rate (HRR) and lowering the NOx, specific fuel consumption (SFC), and particulate matter (soot) while substantially completing the combustion of the fuel.

Figure 9:
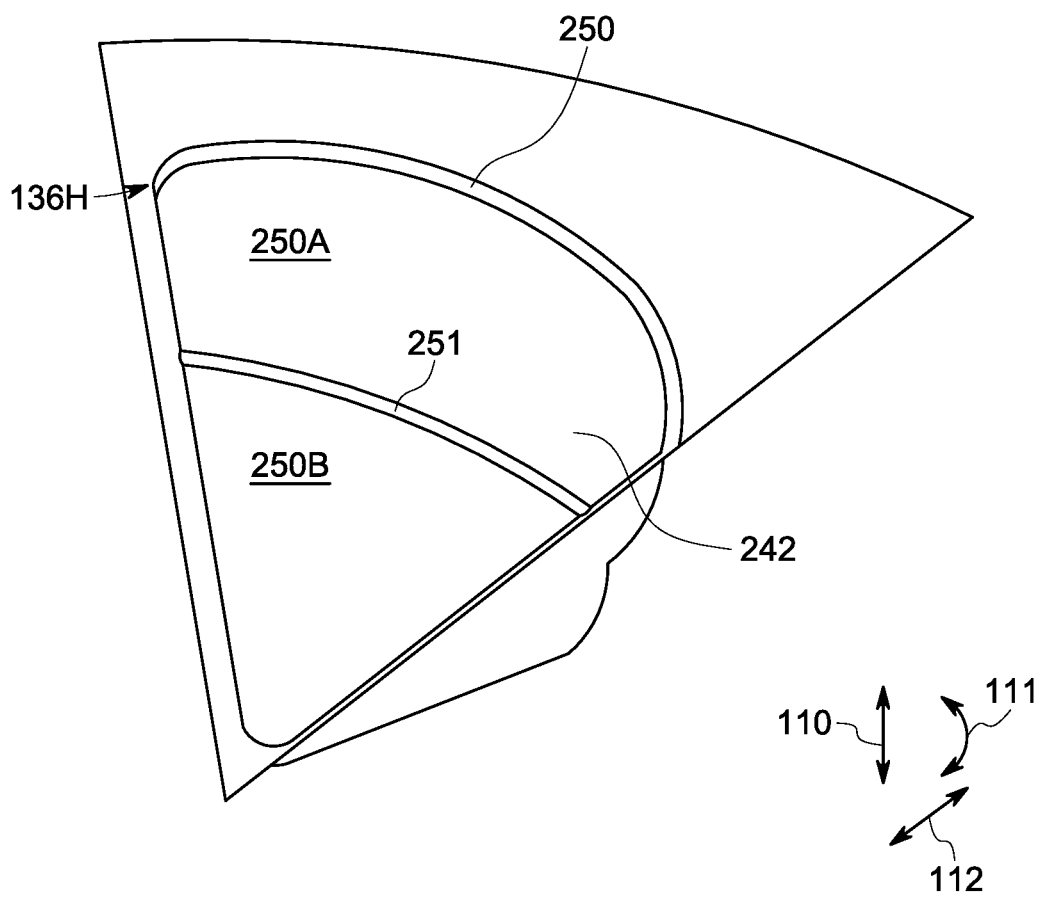
FIG. 9 illustrates an isometric view of a recess of a piston bowl, in accordance with yet another embodiment of the present disclosure.

FIG. 9 shows an isometric view of a recess of a plurality of recesses 242 formed in a piston bowl 136H in accordance with yet another embodiment. It should be noted herein that the recess 242 is substantially similar to each recess of the plurality of recesses 202 discussed in the embodiment of FIG. 7A, except that a peripheral wall 250 of the recess 242 has a stepped wall 251 to form into two pockets 250A and 250B along a length of the peripheral wall 250. Similar, to the embodiment of FIG. 7A, the piston bowl 136H may provide in-cylinder solutions for reducing emissions and specific fuel consumption by the IC engine, while maintaining the same amount of power output from the IC engine.

Figure 10:
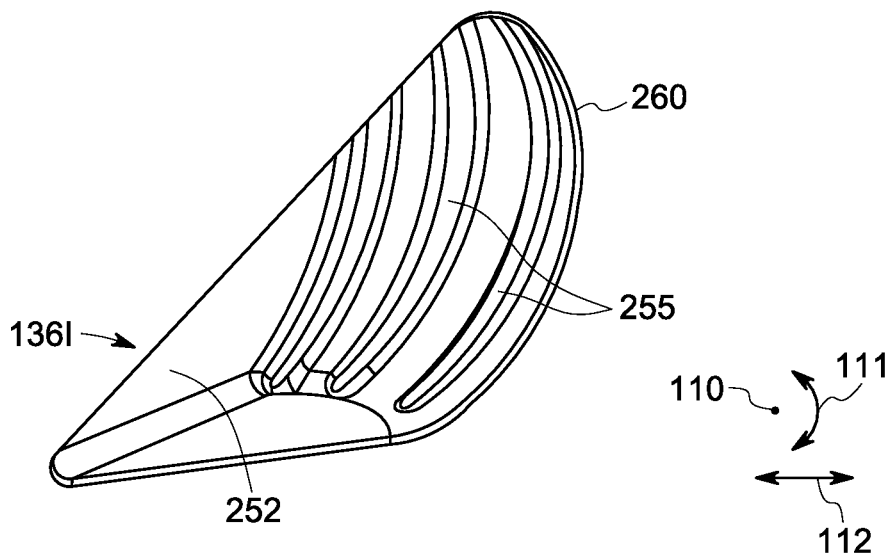
FIG. 10 illustrates an isometric view of a recess of a piston bowl, in accordance with yet another embodiment of the present disclosure.

FIG. 10 shows an isometric view of a recess 252 formed in a piston bowl 136I in accordance with yet another embodiment. It should be noted herein that the one recess 252 is substantially similar to each recess of a plurality of recesses 182 discussed in the embodiment of FIG. 6A, except that a peripheral wall 260 of the recess 252 includes a plurality of ridges 255 extending along a circumferential direction 111 and disposed facing a center of a piston crown. In one embodiment, the plurality of ridges 255 is spaced apart from each other and extends in-parallel to one another along the circumferential direction 111. Similar to the embodiment of FIG. 6A, the piston bowl 136I may provide in-cylinder solutions for reducing emissions and specific fuel consumption by the IC engine, while maintaining the same amount of power output from the IC engine.

Figure 11:
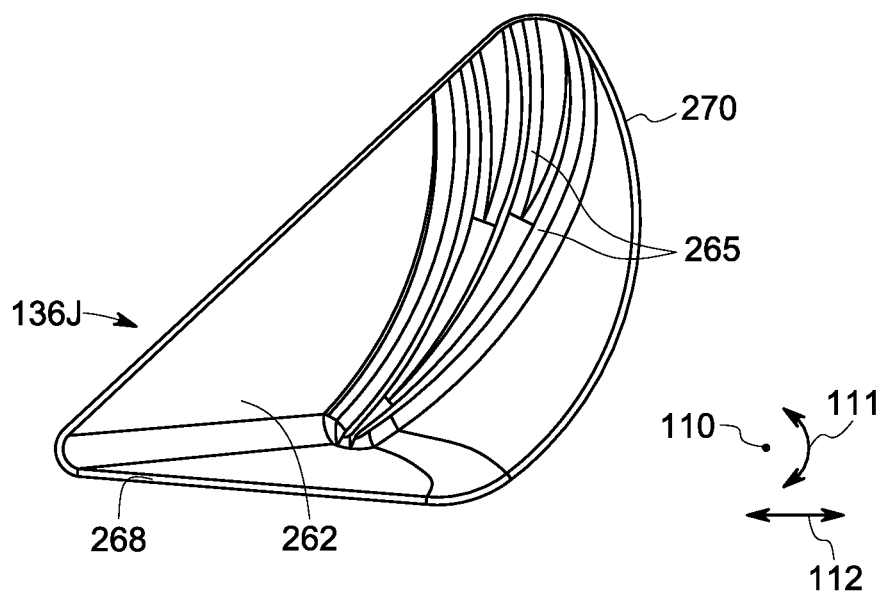
FIG. 11 illustrates an isometric view of a recess of a piston bowl, in accordance with yet another embodiment of the present disclosure.

FIG. 11 shows an isometric view of a recess 262 formed in a piston bowl 136J in accordance with yet another embodiment. It should be noted herein that the recess 262 is substantially similar to each recess of a plurality of recesses 182 discussed in the embodiment of FIG. 6A, except that a peripheral wall 270 of the recess 262 includes a plurality of ridges 265 extending disposed facing a center of a piston crown. In one embodiment, the plurality of ridges 265 extend along the circumferential direction 111 and converge towards an end portion of one side wall of the pair of side walls, for example, a first side wall 268 of the recess 262. Similar, to the embodiment of FIG. 6A, the piston bowl 136J may provide in-cylinder solutions for reducing emissions and specific fuel consumption by the IC engine, while maintaining the same amount of power output from the IC engine.

Figure 12:
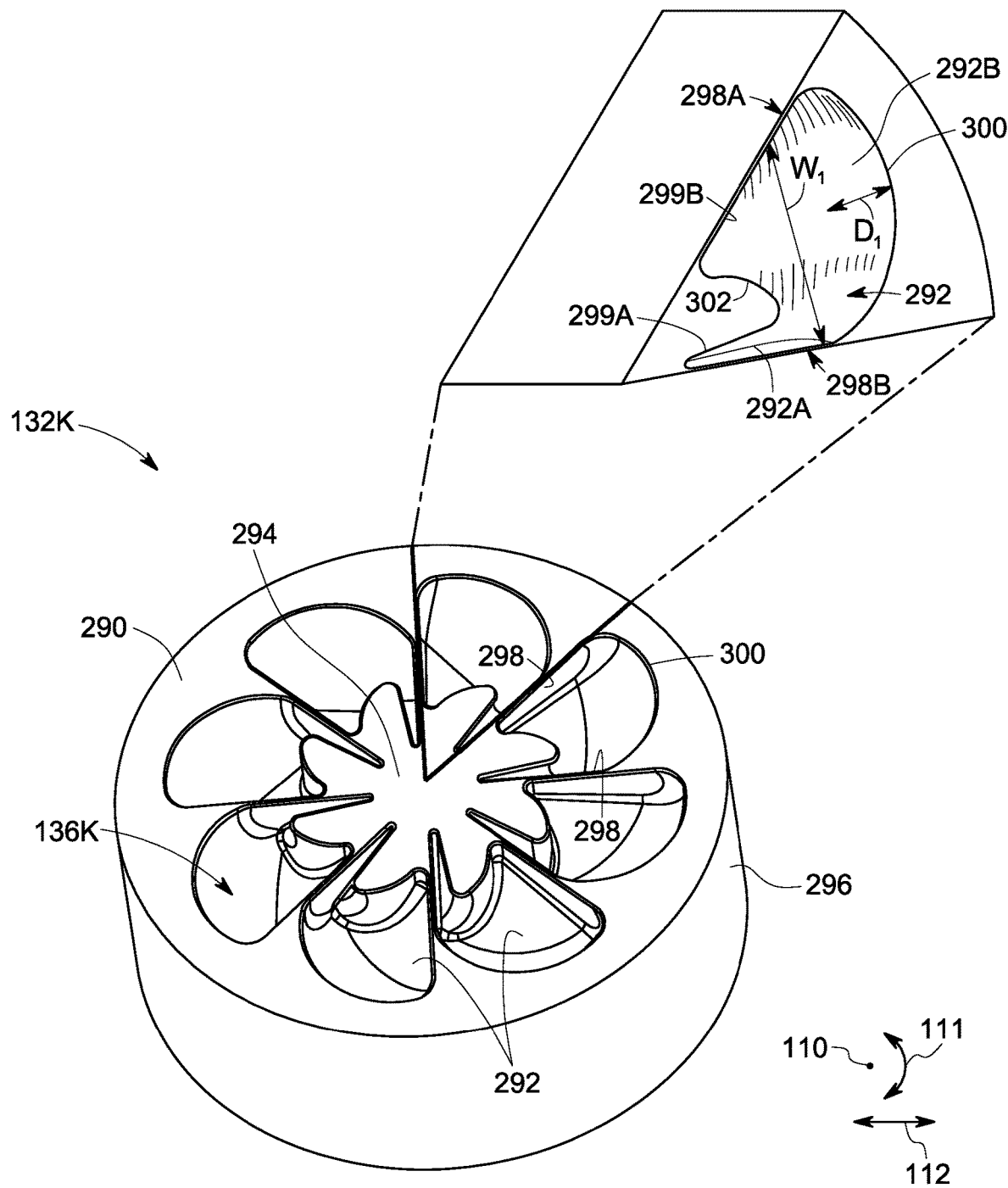
FIG. 12 illustrates an isometric view of a piston crown, in accordance with yet another embodiment of the present disclosure.

FIG. 12 shows an isometric view of a piston crown 132K in accordance with yet another embodiment. In one or more embodiments, a piston bowl 136K is formed on a top side 290 of the piston crown 132K. The piston bowl 136K includes a plurality of recesses 292 arranged spaced apart from each other along a circumferential direction 111. Specifically, each of the plurality of recesses 292 extends between a center 294 of the piston crown 132K and a circumference 296 of the piston crown 132K In the illustrated embodiment, the plurality of recesses 292 are discrete recesses.

In one embodiment, each recess of the plurality of recesses 292 is defined by a pair of side walls 298 diverging from the center 294 towards the circumference 296 of the piston crown 132K, and a peripheral wall 300 extending between the pair of side walls 298 proximate to the circumference 296. In the illustrated embodiment, the pair of side walls 298 includes a first side wall 298A and a second side wall 298B. In such example embodiment, at least one wall of the pair of side walls 298 includes two portions, for example, the first side wall 298A includes a first portion 299A and a second portion 299B. The piston bowl 136K further includes a curved intermediate wall 302. In such embodiments, the first portion 299A is connected to the second portion 299B via the curved intermediate wall 302. Further, each recess of the plurality of recesses 292 includes a first recess portion 292A and a second recess portion 292B. The first recess portion 292A is defined by a portion of the second side wall 298B and the first portion 299A. Similarly, the second recess portion 292B is defined by a remaining portion of the second side wall 298B, the curved intermediate wall 302, and the second portion 299B. As discussed in the embodiment of FIG. 6A, each recess of the plurality of recesses 292 has a width "$W_1$" and a depth "$D_1$". In one embodiment, the width "$W_1$" and the depth "$D_1$" are varied along the radial direction 112 for an entire length of each recess of the plurality of recesses 292.

During operation of the combustion system 100, the fuel injector 130 (as shown in FIG. 1) is configured to inject fuel into combustion chamber 140 (as shown in FIG. 1). Specifically, the fuel injector 130 is configured to direct the fuel into the first recess portion 292A, where the fuel is initially constrained with less quantity of air for the fuel to entrain, mix and combust (as shown in FIG. 1). The initial constraining of the fuel may lower the heat release rate (i.e., HRR) in the early stage of the combustion, and may thus reduce NOx and reduce soot oxidation. Further, the fuel and/or the particulate matter (i.e., reacting plumes) are directed towards the second recess portion 292B, where the reacting plumes are exposed to an unutilized quantity of air for rapid combustion/oxidation of the reacting plumes for substantial combustion of the reacting plumes, thereby increasing the apparent heat release rate. Thus, the piston crown 132K may provide in-cylinder solutions for reducing emission and specific fuel consumption by the IC engine, while maintaining the same amount of power output from the IC engine.

Figure 13:
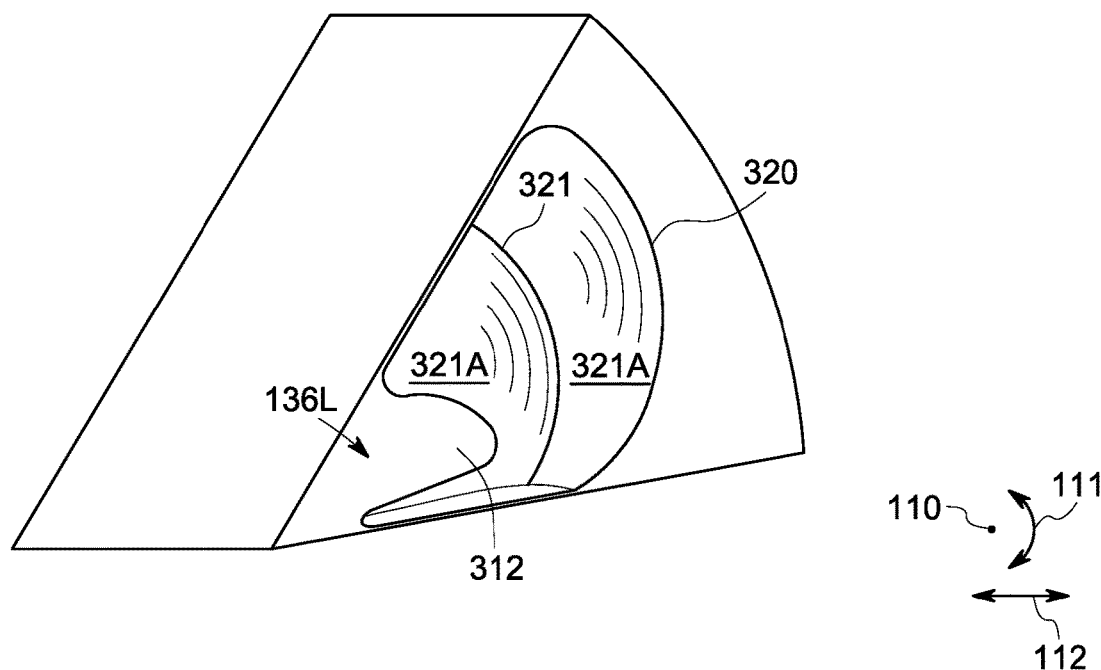
FIG. 13 illustrates an isometric view of a recess of a piston bowl, in accordance with yet another embodiment of the present disclosure.

FIG. 13 shows an isometric view of a recess of a plurality of recesses 312 formed in a piston crown 132L in accordance with yet another embodiment. It should be noted herein that the piston crown 132L is substantially similar to the piston crown 132K discussed in the embodiment of FIG. 12, except that a peripheral wall 320 has a stepped peripheral wall 321 to form two pockets 321A and 321B along the entire length of the peripheral wall 320. Similar, to the embodiment of FIG. 12, the piston bowl 136L may provide in-cylinder solutions for reducing emissions and specific fuel consumption by the IC engine, while maintaining the same amount of power output from the IC engine.

Figure 14:
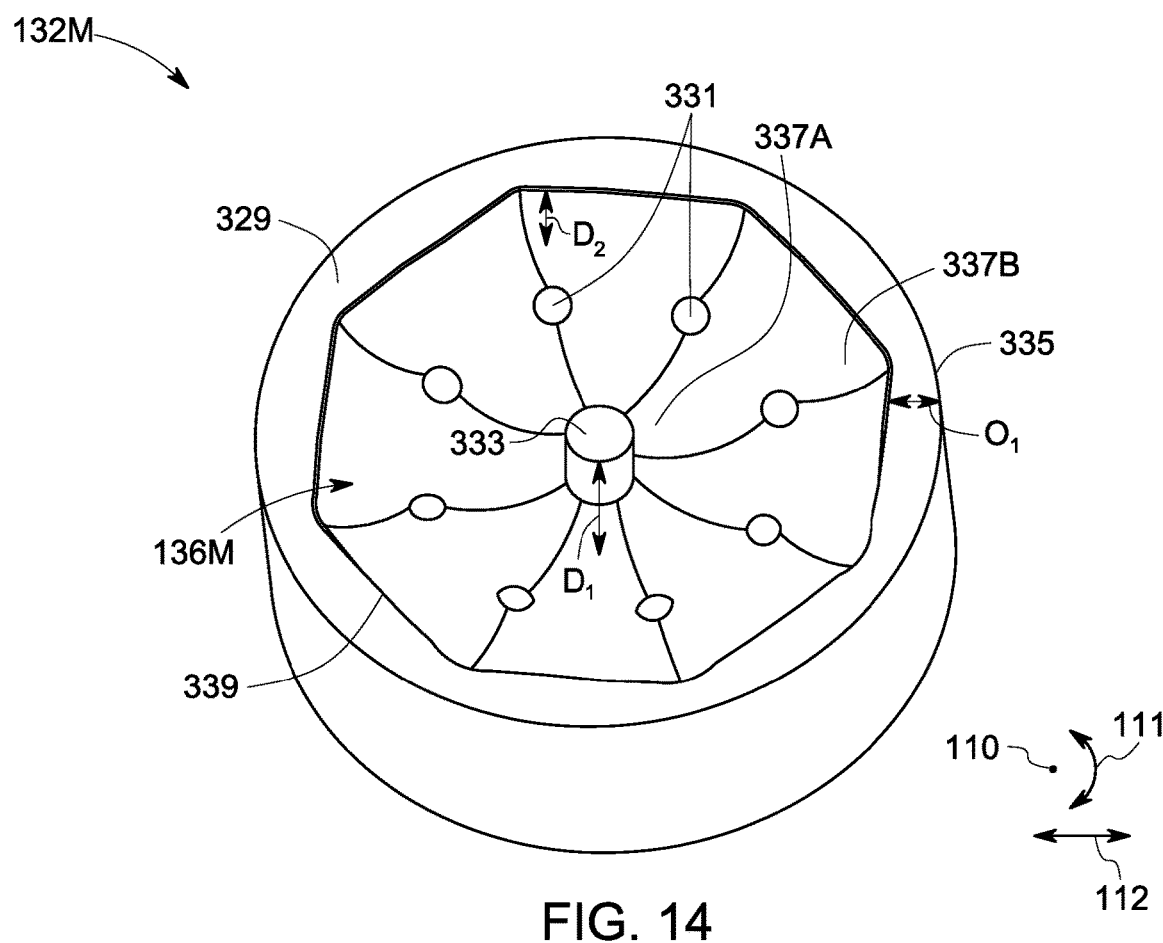
FIG. 14 illustrates an isometric view of a piston crown, in accordance with one embodiment of the present disclosure

FIG. 14 shows an isometric view of a piston crown 132M in accordance with one embodiment. In one or more embodiments, the piston crown 132M includes a piston bowl 136M formed on a top side 329 of the piston crown 132M. The piston bowl 136M includes a plurality of protrusions 331 arranged spaced apart from each other along a circumferential direction 111. Each of the plurality of protrusions 331 is disposed between a center 333 and a peripheral wall 339 of the piston crown 132M. Specifically, each of the plurality of protrusions 331 is arranged substantially in a middle of the piston bowl 136M and faces the center 333 of the piston crown 132M. It should be noted herein that the term "substantially in a middle" refers to about 30 percent to 80 percent of a length of the piston bowl 136M, extending radially between the center 333 and the peripheral wall 339. In the illustrated embodiment, the peripheral wall 339 is located proximate to a circumference 335 of the piston crown 132M and extends 360 degrees on the top side 329 of the piston crown 132M. Additionally, the peripheral wall 339 is offset from the circumference 335 by a radial distance "01". Further, at least one of the plurality of protrusions 331 has a spherical shaped dome structure and a radius of the spherical shaped dome structure is greater than 1.5 mm. The plurality of protrusions 331 bifurcates the piston bowl 136M into two sections, for example, a first section 337A and a second section 337B, where the first section 337A has a gradually extended depth "$D_1$" from the center 333 till the plurality of protrusions 331, and the second section 337B has a gradually decreased depth "$D_2$" from the plurality of protrusions 331 up to the peripheral wall 339 of the piston bowl 136M.

During operation of the combustion system 100, the fuel injector 130 (as shown in FIG. 1) is configured to inject fuel into combustion chamber 140 (as shown in FIG. 1). Specifically, the fuel injector 130 is configured to direct the fuel towards each of the plurality of protrusions 331, where the fuel is initially constrained with less quantity of air for the fuel to entrain, mix and combust in the cylinder 102 (as shown in FIG. 1). The initial constraining of the fuel may lower the heat release rate (i.e., HRR) in the early stage of the combustion, and may thus reduce NOx and reduce soot oxidation. Further, each of the plurality of protrusions 331 splits the fuel and/or the particulate matter (i.e., reacting plumes), for example, into at least two portions and guide the one portion into first section 337A and direct another portion into the second section 337B. Thus, the reacting plumes are exposed to an unutilized quantity of air for rapid combustion/oxidation to substantially complete the combustion, thereby increase the apparent HRR, and reduce emissions and specific fuel consumption by the IC engine.

Figure 15A:
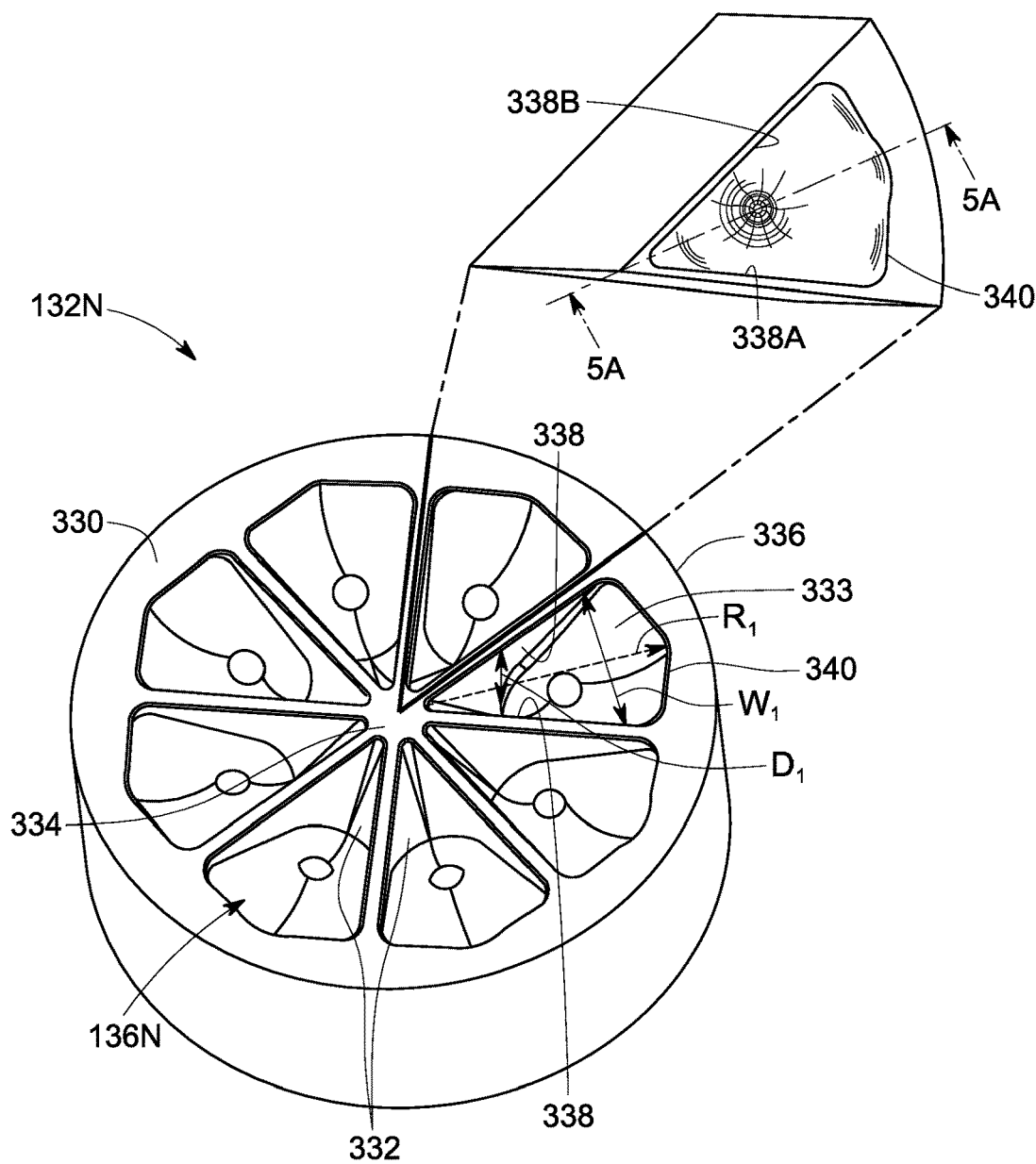
FIG. 15A illustrates an isometric view of a piston crown, in accordance with another embodiment of the present disclosure.
Figure 15B:
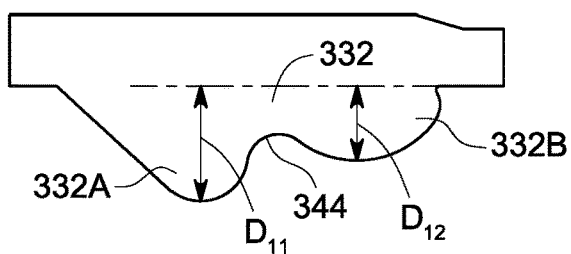
FIG. 15B illustrates a schematic diagram of one recess of a plurality of recesses taken along a line 5A-5A of FIG. 15A, in accordance with another embodiment of the present disclosure.

FIG. 15A shows an isometric view of a piston crown 132N in accordance with another embodiment. FIG. 15B shows a schematic diagram of one recess of a plurality of recesses 332 taken along a line 5A-5A of FIG. 15A in accordance with another embodiment. In one or more embodiments, the piston crown 132N includes a piston bowl 136N formed on a top side 330 of the piston crown 132N. It should be noted herein that the piston bowl 136N is substantially similar to a piston bowl 136M discussed in the embodiment of FIG. 14, except that the piston bowl 136N includes a plurality of recesses 332. Specifically, the piston bowl 136N includes the plurality of recesses 332 arranged spaced apart from each other along a circumferential direction 111. Where, each of the plurality of recesses 332 extends between a center 334 of the piston crown 132N and a circumference 336 of the piston crown 132N. In the illustrated embodiment, the plurality of recesses 232 are discrete recesses. Further, the piston bowl 136N includes a plurality of protrusions 344, where at least one protrusion of the plurality of protrusions 344 is disposed in a recess of the plurality of recesses 332. In the illustrated embodiment, the plurality of recesses 332 are discrete recesses.

In the illustrated embodiment of FIG. 15B, each of the plurality of protrusions 344 is located at a mid-region of each recess of the plurality of recesses 332, facing the center 334 of the piston crown 132N. Each of the plurality of protrusions 344 bifurcates the recess of the plurality of recesses 332 into two cup-shaped recess sections, for example, a first section 332A and a second section 332B.

In one embodiment, each recess of the plurality of recesses 332 is defined by a pair of side walls 338 diverging from the center 334 towards the circumference 336 of the piston crown 132N, and a portion of a peripheral wall 340 extending between the pair of side walls 338 and located proximate to the circumference 336. In one embodiment, each recess of the plurality of recesses 332 has varied radii "$R_1$" from the center 334. Further, each recess of the plurality of recesses 332 has a width "$W_1$" and a depth "$D_1$". In one embodiment, the width "$W_1$" and the depth "$D_1$" are varied along the radial direction 112 for an entire length of each recess of the plurality of recesses 332. Specifically, a depth "$D_{11}$" of each recess of the plurality of recesses 332 in the first section 332A is gradually extended from the center 334 till the protrusion of the plurality of protrusions 344, and a depth "$D_{12}$" of each recess of the plurality of recesses 332 in the second section 332B is gradually decreased from the protrusion of the plurality of protrusions 344 till the peripheral wall 340. Further, the depth "$D_{11}$" of the first section 332A is greater than the depth "$D_{12}$" of the second section 332B. Similarly, the width "$W_1$" of each recess of the plurality of recesses 332 is extended from the center 334 towards the circumference 336.

During operation of the combustion system 100, the fuel injector 130 (as shown in FIG. 1) is configured to inject fuel into combustion chamber 140 (as shown in FIG. 1). Specifically, the fuel injector 130 is configured to direct the fuel towards each of the plurality of protrusions 344, where the fuel is initially constrained with less quantity of air for the fuel to entrain, mix and combust in the cylinder 102 (as shown in FIG. 1). The initial constraining of the fuel may lower the heat release rate (i.e., HRR) in the early stage of the combustion, and may thus reduce NOx and reduce soot oxidation. Further, each of the plurality of protrusions 344 splits the fuel and/or the particulate matter (i.e., reacting plumes), for example, into at least two portions and guide the one portion into first section 333A and direct another portion into the second section 333B. Thus, the reacting plumes are exposed to an unutilized quantity of air for rapid combustion/oxidation to substantially complete the combustion, thereby increase the apparent HRR, and reduce emissions and specific fuel consumption by the IC engine.

Figure 16:
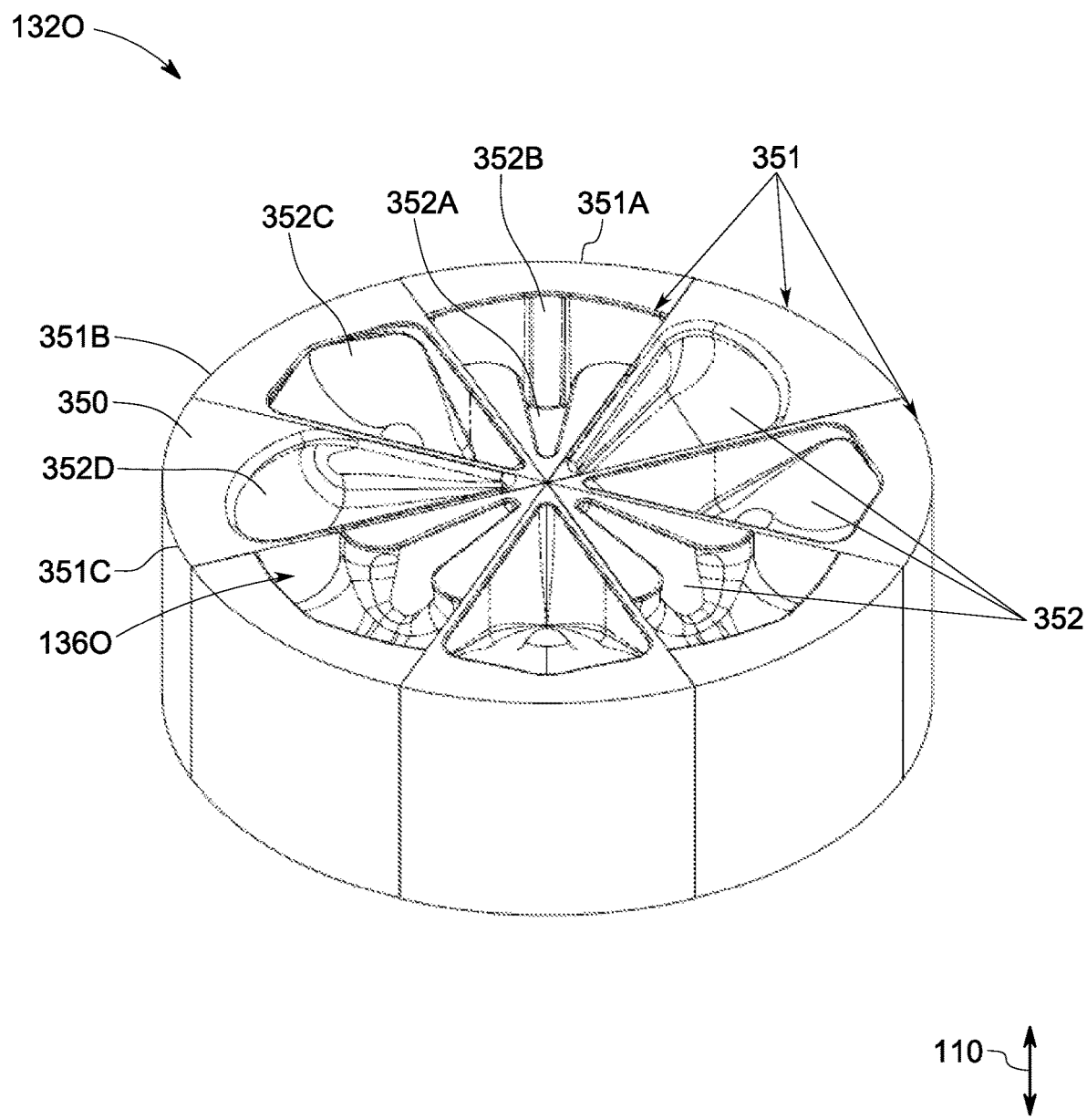
FIG. 16 illustrates an isometric view of a piston crown, in accordance with one embodiment of the present disclosure.

FIG. 16 shows an isometric view of a piston crown 132O in accordance with yet another embodiment. In the illustrated embodiment, a piston bowl 136O is formed on a top side 350 of the piston crown 132O. Further, the piston bowl 136O includes a plurality of sectors 351 arranged spaced apart from each other along a circumferential direction 111. In such example embodiments, one sector 351A of the plurality of sectors 351 includes a first recess 352A and a second recess 352B, which is substantially similar to a first recess 153 and a second recess 155, as discussed in the embodiment of FIG. 3. Similarly, another sector 351B adjacent to the sector 351A includes one recess 352C, which is substantially similar to a recess 332 discussed in the embodiment of FIG. 15A. Further, yet another sector 351C adjacent to the sectors 351B includes a recess 352D, which is substantially similar to a recess 182 discussed in the embodiment of FIG. 6A. In one embodiment, the combination of first recess 352A and the second recess 352B, the recess 352C, and the recess 352D are arranged adjacent to one another along circumferential direction 111. Similar, to the embodiments of FIGS. 2A, 2B, 3-5, 6A, 7A, 8A, 9-14, 15A, and 15B the piston bowl 136O may provide in-cylinder solutions for reducing emissions and specific fuel consumption by the IC engine, while maintaining the same amount of power output from the IC engine. In some other embodiments, the piston crown 132O may have one pattern of different recesses disposed adjacent to one another. In other words, the design of each recess of the plurality of recesses 352 may be different than the design of the recesses adjacent to it. While the piston crown 132O having an exemplary pattern of different recesses 352 has been shown in the embodiment of FIG. 15, it may be clear to one skilled in the art that another piston crown may include another pattern (i.e., combinations of performance-enhancing recesses), which may yield similar benefits to the piston crown 132O.

Figure 17:
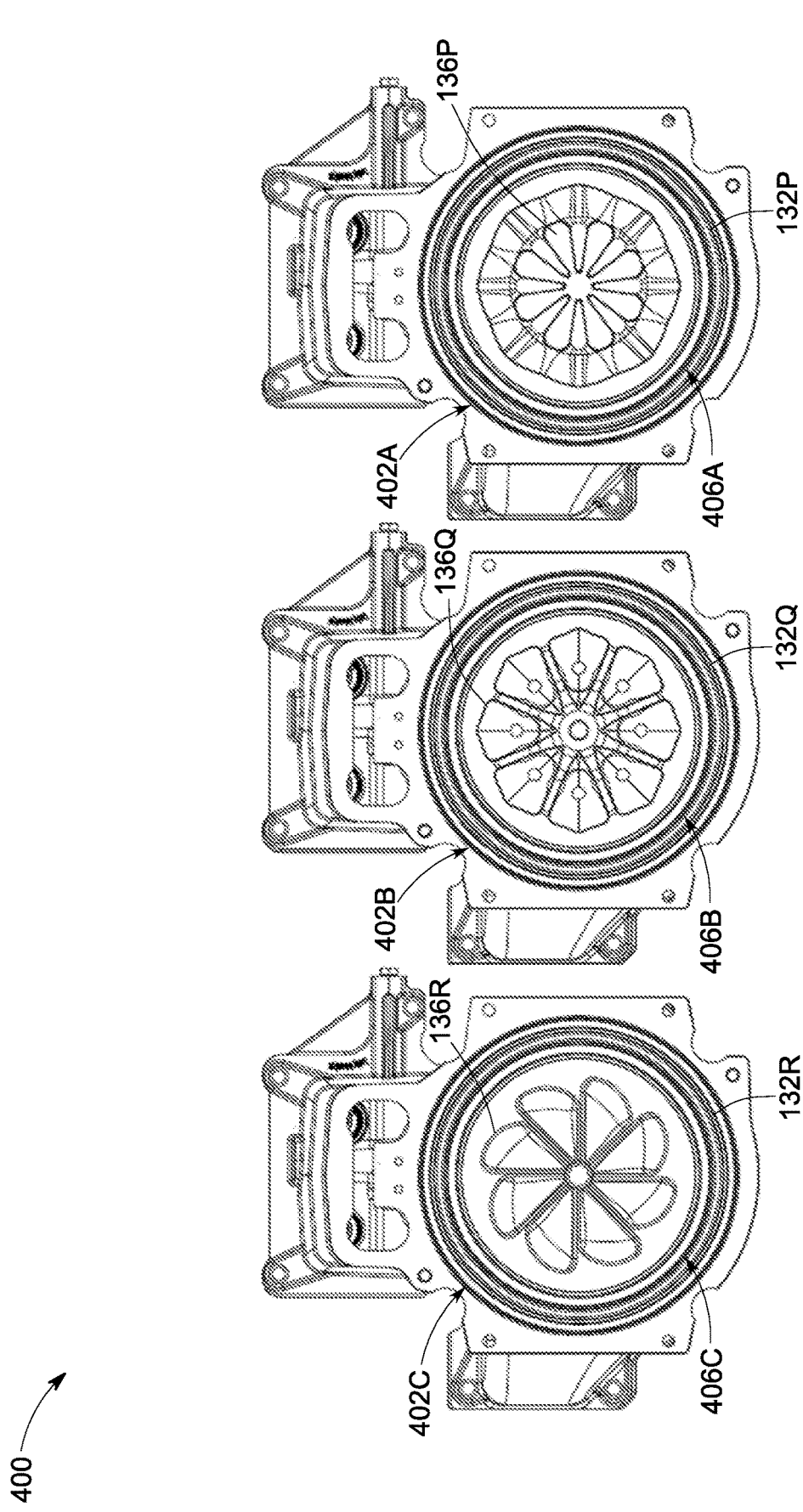
FIG. 17 illustrates a schematic diagram of a portion of a combustion system, in accordance with one embodiment of the present disclosure.

FIG. 17 shows a schematic diagram of a portion of a combustion system 400 in accordance with another embodiment. The combustion system 400 is substantially similar to a combustion system 100 discussed in the embodiment of FIG. 1, except that the combustion system 400 includes three cylinders, for example, a first cylinder 402A, a second cylinder 402B, and a third cylinder 402C, and three pistons, for example, a first piston 406A, a second piston 406B, and a third piston 406C. Each of the three cylinders is configured to receive a corresponding piston of the three pistons. Further, each of the three pistons includes a piston crown, for example, the first piston 406A includes a first piston crown 132P, the second piston 406B includes a second piston crown 132Q, and the third piston 406C includes a third piston crown 132R. It should be noted herein that the first piston crown 132P is substantially similar to the piston crown 132B discussed in the embodiment of FIG. 3, the second piston crown 132Q is substantially similar to the piston crown 132N discussed in the embodiment of FIGS. 15A and 15B, and the third piston crown 132R is substantially similar to the piston crown 132E discussed in the embodiment of FIGS. 6A, 6B, and 6C. Similar, to the embodiments of FIGS. 2A, 2B, 3-5, 6A, 7A, 8A, 9-14, 15A, 15B, and 16, the first, second, and third piston bowls 136P, 136Q, 136R respectively may provide in-cylinder solutions for reducing emissions and specific fuel consumption by the IC engine, while maintaining the same amount of power output from the IC engine.

Figure 18:
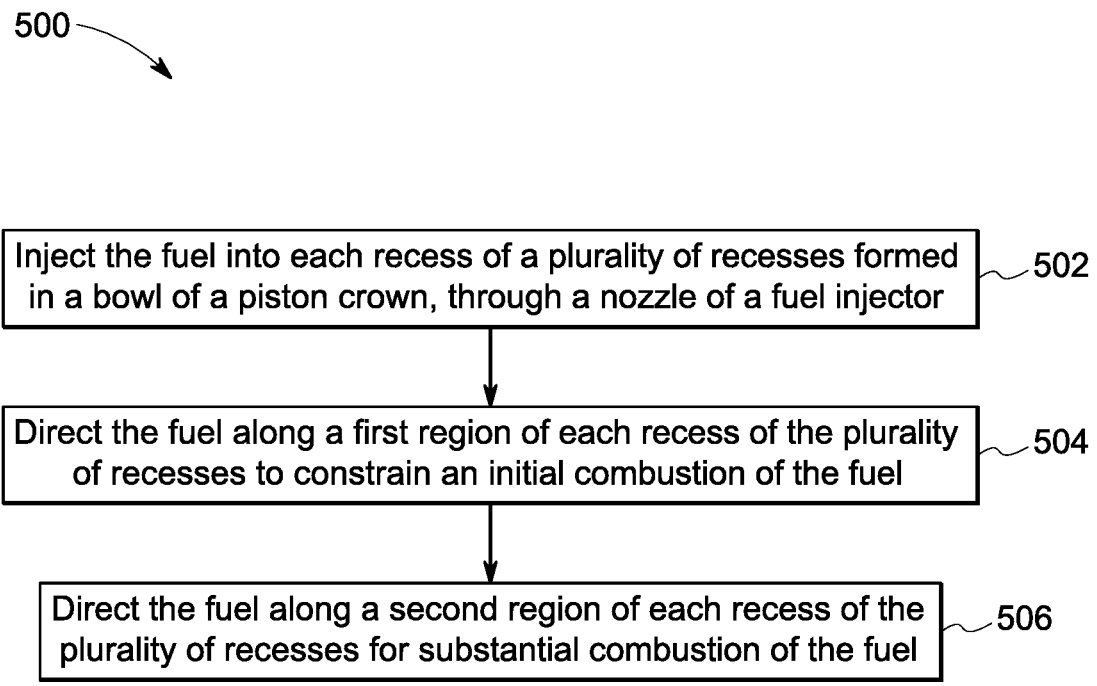
FIG. 18 is a flow chart illustrating a method of controlling a combustion of a fuel in a combustion system, in accordance with one embodiment of the present disclosure.

FIG. 18 is a flow chart illustrating a method 500 of controlling a combustion of fuel in a combustion system in accordance with one embodiment. The method 500 involves a step 502 of injecting the fuel into one recess of a plurality of recesses formed in a piston bowl of a piston crown, through a fuel nozzle of a fuel injector. As discussed in the embodiments of FIGS. 2A, 2B, 3-5, 6A, 7A, 8A, 9-14, 15A, 15B, and 16-17, the plurality of recesses is arranged spaced apart from each other along a circumferential direction, and a width and a depth of each recess of the plurality of recesses are extended along a radial direction for an entire length of the at least one recess.

The method 500 further involves a step 504 of directing the fuel along a first region of each recess of the plurality of recesses to constrain an initial combustion of the fuel. The step 504 of directing the fuel along the first region includes directing the fuel along a first recess as discussed in the embodiment of FIGS. 2A, 2B, 3-5, and 15-16 or along at least one wall of a pair of side walls of each recess, as discussed in the embodiments of FIGS. 6A, 7A, 8A, 9-13 and 15-16 or towards a plurality of protrusions as discussed in the embodiments of FIGS. 14, 15A, 15B, and 16-17. In the step 504, the fuel is initially constrained with less quantity of air to entrain, mix, and combust. Thus, resulting in lowering the heat release rate (i.e., HRR) in the early stage of the combustion, and reducing NOx and reducing soot (particulate matter) oxidation.

Further, the method 500 involves a step 506 of directing the fuel along the second region of each recess of the plurality of recesses for substantial combustion of the fuel. The step 506 of directing the fuel along the second region includes guiding the fuel and/or the particulate matter (i.e., reacting plumes) towards a circumferential recess, as discussed in the embodiments of FIGS. 2A and 2B, or towards a second recess as discussed in the embodiments of FIGS. 3-5 and 15-16 or guiding the reacting plumes i) from the first wall towards a second wall of each recess of the plurality of recesses or ii) towards a stepped peripheral wall or iii) towards a plurality of ridges formed on a peripheral wall, as discussed in the embodiments of FIGS. 6-13 and 15-16 or guiding another portion of the reacting plumes into a first section defined by each of the plurality of protrusions and a second section defined by each of the plurality of protrusions, as discussed in the embodiments of FIGS. 14-16. The step 506 of guiding the reacting plumes into the second region may result in utilizing the unutilized quantity of air for rapid combustion/oxidation of reacting plumes to substantially complete the combustion. Thus, increasing the apparent HRR and reducing emissions (NOx and/or particulate matter) and specific fuel consumption of the IC engine.

In certain embodiments, the method 500 may additionally involve a step of guiding a remaining portion of the fuel (i.e., reacting plumes) into a squish region of the combustion chamber using a reentrant lip for combustion of the remaining portion of the fuel.

In accordance with certain embodiments discussed herein, an exemplary piston crown discussed herein may provide in-cylinder solutions for controlling combustion of fuel to notably reduce soot (particulate emissions). Further, the various designs of the piston crown as discussed in the embodiments of FIGS. 2A, 2B, 3-5, 6A, 7A, 8A, 9-14, 15A, 15B, and 16-17 may control combustion of the fuel, thereby regulate emission and improve fuel efficiency of an IC engine. Further, the piston crown may be detachably coupled to a piston skirt, thereby allow an option to retrofit the piston crown to a piston. A combustion system using such piston bowl may not require an exhaust aftertreatment device for treatment of emissions, thereby reducing the packaging challenges, potential reliability issues associated with the aftertreatment device, and also reducing the cost and complexity of the system.

While only certain features of embodiments have been illustrated and described herein, many modifications and changes will occur to those skilled in the art. It is, therefore, to be understood that the appended embodiments are intended to cover all such modifications and changes as falling within the scope of the disclosed technique.

The invention claimed is:

1. A piston crown comprising:
   a piston bowl comprising:
   a circumferential recess disposed proximate to a circumference of the piston crown; and
   first recesses spaced apart from each other along a circumferential direction, wherein each of the first recesses extends between a center of the piston crown and the circumferential recess, and wherein a width and a depth of each of the first recesses are extended along a radial direction for an entire length of each of the first recesses,
   wherein each of the first recesses is defined by a pair of first side walls diverging from the center to the circumferential recess, the circumferential recess defined by a peripheral wall and intermediate walls spaced apart from the peripheral wall, each of the intermediate walls extending between mutually opposite side walls of adjacent recesses of the first recesses.

2. The piston crown of claim 1, further comprising second side walls disposed in the circumferential recess and spaced apart from each other along the circumferential direction to form second recesses, wherein each of the second side walls extends along the radial direction between one intermediate wall of the intermediate walls and the peripheral wall, and wherein each of the second recesses is connected to at least one of the first recesses.

3. The piston crown of claim 2, wherein the pair of the first side walls have a first height and the second side walls have a second height different from the first height.

4. The piston crown of claim 2, wherein the piston bowl further comprises a reentrant lip disposed on at least one of the peripheral walls, the pair of the first side walls, the intermediate walls, and the second side walls, wherein the reentrant lip is inclined at a reentrancy angle relative to a longitudinal direction.

5. The piston crown of claim 2, wherein at least one of the pair of the first side walls, the second side walls, or the peripheral wall is a curved wall.

6. The piston crown of claim 2, wherein a depth and a width of the second recesses are extended along the radial direction for an entire length of each of the second recesses.

7. The piston crown of claim 6, wherein the depth of the second recesses is greater than the depth of the first recesses.

8. The piston crown of claim 1, wherein each of the first recesses has an opened-half conical shaped profile.

9. A piston crown comprising:
   a piston bowl comprising recesses arranged and spaced apart from each other along a circumferential direction,
   wherein each of the recesses extends between a center and a circumference of the piston crown, wherein a width and a depth of each of the recesses are varied along a radial direction for an entire length of each of the recesses, and the depth of each of the recesses further varied along the circumferential direction,
   wherein each of the recesses is defined by a pair of side walls diverging from the center towards the circumference, and a peripheral wall extending along the circumferential direction between the pair of side walls,
   wherein the peripheral wall comprises ridges extending along the circumferential direction and facing the center, wherein the ridges are arranged parallelly spaced apart from each other or converge toward an end portion of one side wall of the pair of side walls.

10. The piston crown of claim 9, wherein the piston bowl further comprises a reentrant lip disposed on at least one of the peripheral wall or the pair of side walls, wherein the reentrant lip is inclined at a reentrancy angle relative to a longitudinal direction.

11. The piston crown of claim 9, wherein the peripheral wall comprises a stepped wall.

12. The piston crown of claim 9, wherein the pair of side walls comprises a first wall having a first length and a second wall having a second length different from the first length.

13. The piston crown of claim 9, wherein at least one side wall of the pair of side walls extends tangentially towards the peripheral wall.

14. The piston crown of claim 9, wherein at least one wall of the pair of side walls and the peripheral wall is a curved wall.

15. The piston crown of claim 9, wherein the piston crown further comprises a curved intermediate wall, wherein at least one wall of the pair of side walls comprises a first portion and a second portion connected to the first portion via the curved intermediate wall.

16. The piston crown of claim 9, wherein each of the recesses has a crest-wave shaped profile.

17. A piston crown comprising:
a piston bowl comprising protrusions arranged spaced apart from each other along a circumferential direction, wherein each of the protrusions is disposed between a center and a peripheral wall of the piston bowl and at least one of the protrusions is a spherical shaped dome structure.

18. The piston bowl of claim 17, wherein the protrusions are arranged substantially in a middle of the piston bowl.

19. The piston bowl of claim 17, wherein the spherical shaped dome structure has a radius greater than 1.5 millimeters.

20. The piston crown of claim 17, wherein the piston bowl further comprises recesses arranged spaced apart from each other along the circumferential direction, wherein each of the recesses extends between the center and a circumference of the piston crown, wherein a width and a depth of each of the recesses are varied along a radial direction for an entire length of each of the recesses, and wherein at least one of the protrusions is located within each of the recesses.

21. The piston crown of claim 20, wherein at least one of the protrusions bifurcates a recess of the recesses into two cup-shaped recess sections, wherein a depth of a first section of the two cup-shaped recess sections is greater than a depth of a second section of the two cup-shaped recess sections.

22. The piston crown of claim 20, wherein each of the recesses is defined by a pair of side walls diverging from the center towards the circumference, and a portion of the peripheral wall extending along the circumferential direction between the pair of side walls.

23. The piston crown of claim 22, wherein the piston bowl further comprises a reentrant lip disposed on at least one of the peripheral wall or the pair of side walls, wherein the reentrant lip is inclined at a reentrancy angle relative to a longitudinal direction.

* * * * *